US011463496B2

(12) United States Patent
Skupin et al.

(10) Patent No.: US 11,463,496 B2
(45) Date of Patent: *Oct. 4, 2022

(54) SPATIALLY UNEQUAL STREAMING

(71) Applicant: Fraunhofer-Gesellschaft zur Foerderung der angewandten Forschung e.V., Munich (DE)

(72) Inventors: Robert Skupin, Berlin (DE); Cornelius Hellge, Berlin (DE); Thomas Schierl, Berlin (DE); Yago Sánchez De La Fuente, Berlin (DE); Thomas Wiegand, Berlin (DE); Dimitri Podborski, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/669,226

(22) Filed: Feb. 10, 2022

(65) Prior Publication Data
US 2022/0166818 A1    May 26, 2022

Related U.S. Application Data

(63) Continuation of application No. 16/819,957, filed on Mar. 16, 2020, now Pat. No. 11,283,850, which is a (Continued)

(30) Foreign Application Priority Data

Oct. 12, 2016 (EP) .................................... 16193601
Jul. 8, 2017 (EP) .................................... 17180403

(51) Int. Cl.
*H04L 65/75* (2022.01)
*H04N 21/262* (2011.01)
(Continued)

(52) U.S. Cl.
CPC ............ *H04L 65/762* (2022.05); *H04L 65/70* (2022.05); *H04N 13/117* (2018.05);
(Continued)

(58) Field of Classification Search
CPC ... H04L 65/602; H04L 65/607; H04N 13/383; H04N 13/117; H04N 13/194;
(Continued)

(56) References Cited

U.S. PATENT DOCUMENTS 10,104,415 B2   10/2018 Lee et al.
10,593,028 B2   3/2020 Najaf-Zadeh et al.
(Continued)

FOREIGN PATENT DOCUMENTS

CN    1600032 A    3/2005
CN    2806473 Y    8/2006
(Continued)

OTHER PUBLICATIONS

"B. Long: The structure of an MPEG-DASH MDP", URL: https//www.brendanlong.com/the-structure-of-an-mpegdash-mpd.html, Mar. 2015.
(Continued)

*Primary Examiner* — John W Miller
*Assistant Examiner* — Omer Khalid
(74) *Attorney, Agent, or Firm* — Perkins Coie LLP; Michael A. Glenn

(57) ABSTRACT

Various concepts for media content streaming are described. Some allow for streaming spatial scene content in a spatially unequal manner so that the visible quality for the user is increased, or the processing complexity or used bandwidth at the streaming retrieval site is decreased. Others allow for streaming spatial scene content in a manner enlarging the applicability to further application scenarios.

2 Claims, 15 Drawing Sheets

Related U.S. Application Data continuation of application No. 16/381,912, filed on Apr. 11, 2019, now Pat. No. 11,218,530, which is a continuation of application No. PCT/EP2017/075971, filed on Oct. 11, 2017.

(51) Int. Cl.

| | |
|---|---|
| *H04N 21/845* | (2011.01) |
| *H04N 21/4728* | (2011.01) |
| *H04N 21/2343* | (2011.01) |
| *H04L 65/70* | (2022.01) |
| *H04N 13/383* | (2018.01) |
| *H04N 13/117* | (2018.01) |
| *H04N 13/194* | (2018.01) |
| *H04N 13/161* | (2018.01) |

(52) U.S. Cl.
CPC ......... *H04N 13/161* (2018.05); *H04N 13/194* (2018.05); *H04N 13/383* (2018.05); *H04N 21/23439* (2013.01); *H04N 21/26258* (2013.01); *H04N 21/4728* (2013.01); *H04N 21/8456* (2013.01)

(58) Field of Classification Search
CPC ........... H04N 13/161; H04N 21/23439; H04N 21/26258; H04N 21/4728; H04N 21/8456
USPC ...................................... 348/430.1
See application file for complete search history.

(56) References Cited

U.S. PATENT DOCUMENTS

| | | |
|---|---|---|
| 2008/0043832 A1 | 2/2008 | Barkley et al. |
| 2010/0017885 A1 | 1/2010 | Cohen et al. |
| 2010/0067822 A1 | 3/2010 | Young |
| 2010/0166068 A1 | 7/2010 | Perlman et al. |
| 2010/0277361 A1 | 11/2010 | Focke et al. |
| 2012/0314948 A1 | 12/2012 | Raveendran et al. |
| 2013/0021915 A1 | 1/2013 | Catovic et al. |
| 2013/0294500 A1 | 11/2013 | Wang |
| 2014/0023351 A1 | 1/2014 | Kaburlasos et al. |
| 2014/0086333 A1 | 3/2014 | Wang |
| 2015/0116455 A1 | 4/2015 | Suh et al. |
| 2015/0208095 A1 | 7/2015 | Schierl et al. |
| 2015/0213617 A1 | 7/2015 | Kim et al. |
| 2015/0237166 A1 | 8/2015 | Denoual et al. |
| 2015/0346812 A1 | 12/2015 | Cole et al. |
| 2016/0012855 A1 | 1/2016 | Krishnan |
| 2016/0165151 A1 | 6/2016 | Corlett |
| 2016/0277772 A1* | 9/2016 | Campbell ............. G06T 19/006 |
| 2018/0061002 A1* | 3/2018 | Lee ...................... H04N 13/194 |
| 2018/0077210 A1* | 3/2018 | Hannuksela ..... H04N 21/23439 |
| 2018/0295400 A1 | 10/2018 | Thomas et al. |

FOREIGN PATENT DOCUMENTS

| | | |
|---|---|---|
| CN | 101802644 A | 8/2010 |
| CN | 102428484 A | 4/2012 |
| CN | 103081487 A | 5/2013 |
| CN | 104735464 A | 6/2015 |
| CN | 104811683 A | 7/2015 |
| EP | 3076672 A1 | 10/2016 |
| JP | 2015526006 A | 9/2015 |
| JP | 2016521497 A | 7/2016 |
| KR | 20100074192 A | 7/2010 |
| KR | 20140018431 A | 2/2014 |
| KR | 20140074369 A | 6/2014 |
| KR | 20150070260 A | 6/2015 |
| KR | 20160002981 A | 1/2016 |
| TW | 201411479 A | 3/2014 |
| WO | 03049450 A2 | 6/2003 |
| WO | 2009051719 A2 | 4/2009 |
| WO | 2013068498 A2 | 5/2013 |
| WO | 2014004905 A1 | 1/2014 |
| WO | 2014170176 A1 | 10/2014 |
| WO | 2015014773 A1 | 2/2015 |
| WO | 2015197815 A1 | 12/2015 |
| WO | 2016050283 A1 | 4/2016 |
| WO | 2016130895 A1 | 8/2016 |
| WO | 2017200804 A1 | 11/2017 |

OTHER PUBLICATIONS

VR Net, New algorithm for VR video streaming, 2016, https://news.hiavr.com/20160810news/detail/23577.html?type=1, 2016.

"Information Technology—Dynamic adaptive streaming over HTTP (DASH)—Part 1: Media Presentation description and segment formats", ISO/IEC 23009-1:2014, Aug. 30, 2011, 131 pages.

Long, Brendan, "The Structure of an MPEG-DASH MPD—Brendan Long", Online Resource XP055214008, 4 pages.

Maze, Frederic, et al., "Quality adaptation for tile based streaming in DASH", 116. MPEG Meeting: Oct. 17, 2016-Oct. 21, 2016; Chengdu; (Motion Picture Expert Group or ISO/IEC JTC1/SC29/WG11) (Oct. 12, 2016), XP030067601, 4 pages.

Niamut, Omar A., et al., "MPEG DASH SRD: spatial relationship description", Proceedings of the 7th International Conference an Multimedia Systems, MMSys '16, Jan. 1, 2016 (Jan. 1, 2016), pp. 1-8, XP055703731, New York, New York, USA, DOI: 10.1145/2910017.2910606 ISBN: 978-1-4503-4297-1, Jun. 17, 2015.

Van Deventer, M. Oskar, et al., "White paper an Spatial Relationship Description in MPEG DASH part 1 AMD2", 112. MPEG Meeting; Jun. 22, 2015-Jun. 26, 2015; Warsaw; (Motion Picture Expert Group or ISO/IEC JTC1/SC29/WG11), No. m36458, Jun. 17, 2015; XP030064826.

* cited by examiner

SPATIALLY UNEQUAL STREAMING

CROSS-REFERENCE TO RELATED APPLICATIONS

This application is a continuation of U.S. patent application Ser. No. 16/819,957, filed Mar. 16, 2020, which is a continuation of U.S. patent application Ser. No. 16/381,912, filed Apr. 11, 2019, now U.S. Pat. No. 11,218,530, which is a continuation of International Application No. PCT/EP2017/075971, filed Oct. 11, 2017, which is incorporated herein by reference in its entirety, and additionally claims priority from European Application No. 16193601.8, filed Oct. 12, 2016, and from European Application No. 17180403.2, filed Jul. 8, 2017, which are also incorporated herein by reference in their entirety.

BACKGROUND OF THE INVENTION

The present application is concerned with spatially unequal streaming such as occurring in virtual reality (VR) streaming.

VR streaming typically involves transmission of a very high-resolution video. The resolving capacity of the human fovea is around 60 pixels per degree. If transmission of the full sphere with 360°×180° is considered, one would end up by sending a resolution of around 22 k×11 k pixels. Since, sending such high resolution would lead to tremendously high bandwidth requirements, another solution is to send only the viewport shown at the Head Mounted Displays (HMDs), which have FoV of 90°×90°: leading to around a 6 k×6 k pixels video. A trade-off between sending the whole video at the highest resolution and sending only the viewport is to send the viewport at high resolution and some neighboring data (or the rest of the spherical video) at lower resolution or lower quality.

In a DASH scenario, an omni-directional video (aka spherical video) can be offered in such a way that the mixed resolution or mixed quality video described before is controlled by the DASH client. The DASH client only needs to know information that describes how the content is offered.

One example could be to offer different representations with different projections that have asymmetric characteristics, such as different quality and distortion for different parts of the video. Each representation would correspond to a given viewport and would have the viewport encoded with a higher quality/resolution than the rest of the content. Knowing the orientation information (direction of the viewport for which the content has been encoded with a higher quality/resolution) the DASH client can chose one or another representation dynamically to match the viewing direction of the user at any time.

A more flexible option for a DASH client to select such asymmetric characteristic for the omni-directional video would be when the video is split into several spatial regions, with each region being available at different resolution or quality. One option could be to split it into rectangular regions (aka tiles) based on a grid, but other options could be foreseen. In such a case, the DASH client would need some signaling about the different qualities into which the different regions are offered and it could download the different regions at different qualities so that the viewport shown to the user is at a better quality than the other non-shown content.

In any of the previous cases, when user interaction happens and the viewport is changed, the DASH client will need some time to react to user movement and download the content in such a way that matches the new viewport. During the time between the user moves and the DASH client adapts its requests to match the new viewport, the user will see in the viewport some regions in high quality and low quality simultaneously. Though the acceptable quality/resolution difference is content dependent, the quality the user sees is in any case degraded.

Thus, it would be favorable to have a concept at hand which alleviates, or renders more efficient, or even increases the visible quality for the user with respect to partial presentation of spatial scene content streamed by adaptive streaming.

Thus, the object of the present invention to provide concepts for streaming spatial scene content in a spatially unequal manner so that the visible quality for the user is increased, or the processing complexity or used bandwidth at the streaming retrieval site is decreased, or to provide concepts for streaming spatial scene content in a manner enlarging the applicability to further application scenarios.

SUMMARY

An embodiment may have a video bitstream having a video encoded thereinto, the video bitstream having a signalization of a size and/or a position of one or more of a focus area within the video onto which a decoding power for decoding the video should be focused, and a recommended advantageous view-section area of the video.

Another embodiment may have a decoder for decoding a video bitstream having a video encoded thereinto, the decoder being configured to derive from the video bitstream a signalization of a size and/or position of one or more of a focus area within the video onto which a decoding power for decoding the video should be focused, and a recommended view-section area of the video.

Another embodiment may have a device for streaming a video bitstream from a server, configured to retrieve from the server information on a size and/or a position of one or more of a focus area within the video onto which a decoding power for decoding the video should be focused, and a recommended view-section area of the video, and use the information in adaptively streaming the video bitstream from the server.

Still another embodiment may have a method for decoding a video bitstream having a video encoded thereinto, the decoding being configured to derive from the video bitstream a signalization of a size and/or position of one or more of a focus area within the video onto which a decoding power for decoding the video should be focused, and a recommended view-section area of the video.

Another embodiment may have a method for streaming a video bitstream from a server, configured to retrieve from the server information on a size and/or a position of one or more of a focus area within the video onto which a decoding power for decoding the video should be focused, and a recommended view-section area of the video, and use the information in adaptively streaming the video bitstream from the server.

Still another embodiment may have a non-transitory digital storage medium having stored thereon a computer program for performing a method for decoding a video bitstream having a video encoded thereinto, the decoding being configured to derive from the video bitstream a signalization of a size and/or position of one or more of a focus area within the video onto which a decoding power for decoding the video should be focused, and a recommended view-section area of the video, when said computer program is run by a computer.

Another embodiment may have a non-transitory digital storage medium having stored thereon a computer program for performing a method for streaming a video bitstream from a server, configured to retrieve from the server information on a size and/or a position of one or more of a focus area within the video onto which a decoding power for decoding the video should be focused, and a recommended view-section area of the video, and use the information in adaptively streaming the video bitstream from the server, when said computer program is run by a computer.

A first aspect of the present application is based on the finding that streaming media content pertaining to a temporally-varying spatial scene such as a video in a spatially unequal manner may be improved in terms of visible quality at comparable bandwidth consumption and/or computational complexity at a streaming reception site if the media segments selected and retrieved and/or a signalization obtained from the server, provides the retrieving device with hints on a predetermined relationship to be complied with by qualities at which different portions of the temporally-varying spatial scene are encoded into the selected and retrieved media segments. Otherwise, the retrieving device may not know beforehand as to which negative impact the juxtaposition of portions encoded at different quality into the selected and retrieved media segment may have on the overall visible quality experienced by the user. Information contained in the media segments and/or a signalization obtained from the server such as, for instance, within a manifest file (media presentation description) or additional streaming related control messages from server to client such as SAND messages, enable the retrieving device to appropriately select among the media segments offered at the server. In this manner, virtual reality streaming or partial streaming of video content may be made more robust against quality degradation as it could otherwise occur owing to an inadequate distribution of the available bandwidth on to this spatial section of the temporally-varying spatial scene presented to the user.

A further aspect of the present invention is based on the finding that streaming of media content pertaining to a temporally-varying spatial scene such as a video in a spatially unequal manner such as using a first quality at a first portion and a second, lower quality at a second portion or with leaving a second portion being non-streamed, may be improved in visible quality and/or may be made less complex in terms of bandwidth consumption and/or computational complexity at the streaming retrieval side, by determining a size and/or position of the first portion depending on information contained in the media segments and/or a signalization obtained from the server. Imagine, for instance, the temporally-varying spatial scene would be offered at the server at a tile-based manner for tile-based streaming, i.e. the media segments would represent spectral temporal portions of the temporally-varying spatial scene each of which would be a temporal segment of the spatial scene within a corresponding tile of a distribution of tiles into which the spatial scene is sub-divided. In such a case, it is up to the retrieving device (client) to decide as to how to distribute the available bandwidth and/or computational power over the spatial scene, namely, at the granularity of tiles. The retrieving device would perform the selection of the media segments to the extent that a first portion of the spatial scene which follows respectively tracks a temporally-varying view section of the spatial scene, is encoded into the selected and retrieved media segments in a predetermined quality which may, for instance, be the highest quality feasible at the current bandwidth and/or computational power conditions. A spatially neighboring second portion of the spatial scene may, for instance, not be encoded into the selected and retrieved media segments, or may be encoded there into at a further quality, reduced relative to the predetermined quality. In such a situation, it is a computationally complex matter, or even not feasible, to compute a number/count of neighboring tiles, the aggregation of which completely covers the temporally-varying view section irrespective of the view section's orientation. Depending on the projection chosen so as to map the spatial scene onto the individual tiles, the angular scene coverage per tile may vary over this scene and the fact that the individual tiles may mutually overlap, even renders a computation of a count of neighboring tiles sufficient to cover the view section in spatial terms, irrespective of the view section's orientation, more difficult. Accordingly, in such a situation, the aforementioned information could indicate the size of the first portion as a count N of tiles or a number of tiles, respectively. By this measure, the device would be able to track the temporally-varying view section by selecting those media segments having the co-located aggregation of N tiles encoded there at the predetermined quality. The fact that the aggregation of these N tiles sufficiently covers the view section may be guaranteed by way of the information indicating N. Another example would be information contained in the media segments and/or a signalization obtained from the server, which is indicative of the size of the first portion relative to a size of the view section itself. For example, this information could somehow set a "safety zone" or prefetch zone around the actual view section in order to account for movements of the temporally-varying view section. The larger the speed at which the temporally-varying view section moves across the spatial scene, the larger the safety zone should be. Accordingly, the aforementioned information could be indicative of the size of the first portion in a manner relative to a size of the temporally-varying view section such as in an incremental or scaling manner. A retrieving device setting the size of the first portion according to such information would be able to avoid quality degradation which may otherwise occur owing to non-retrieved or low-quality portions of the spatial scene being visible in the view section. Here, it is irrelevant whether this scene is offered in a tile-based manner or in some other manner.

Related to the just-mentioned aspect of the present application, a video bit stream having a video encoded there into, may be made decodable at an increased quality if the video bit stream is provided with a signalization of a size of a focus area within the video onto which a decoding power for decoding the video should be focused. By this measure, a decoder which decodes the video from the bit stream, could focus, or even restrict, its decoding power onto the decoding of the video onto a portion having the size of the focus area signalized in the video bit stream thereby knowing, for instance, that the thus-decoded portion is decodable by the available decoding power, and spatially covers a wanted section of the video. For instance, the size of the focus area thus signalized could be selected to be large enough in order to cover the size of the view section and a movement of this view section taking the decoding latency in decoding the video into account. Or, put differently, a signalization of a recommended view-section area of the video contained in the video bitstream could allow the decoder to treat this area in an advantageous manner, thereby allowing the decoder to focus its decoding power accordingly. Irrespective of performing area-specific decoding power focusing, the area signalization may be forwarded to a stage selecting on which media segments to download, i.e. where to place and how to dimension the portion of increased quality.

The first and second aspects of the present application are closely related to a third aspect of the present application according to which the fact that a vast number of retrieving devices stream media content from a server, is exploited, so as to gain information which may subsequently be used in order to appropriately set the aforementioned types of information allowing to set the size, or size and/or position, of the first portion and/or appropriately set the predetermined relationship between the first and second quality. Thus, in accordance with this aspect of the present application, the retrieving device (client) sends-out log messages logging one of a momentaneous measurement or a statistical value measuring a spatial position and/or movement of the first portion, a momentaneous measurement or a statistical value measuring a quality of the temporally-varying spatial scene as far as is encoded into the selected media segments and as far as is visible in a view section, and a momentaneous measurement or statistical value measuring the quality of the first portion or a quality of the temporally-varying spatial scene as far as is encoded into the selected media segments and as far as is visible in a view section. Momentaneous measurements and/or statistical values may be provided with time information concerning the time the respective momentaneous measurement or statistical value has been obtained. The log messages may be sent to the server where the media segments are offered, or to some other device evaluating the inbound log messages so as to update, based thereon, current settings of the aforementioned information used to set the size, or size and/or position, of the first portion and/or derive the predetermined relationship based thereon.

In accordance with a further aspect of the present application, streaming media content pertaining to a temporally-varying spatial scene such as a video, in particular in a tile-based manner, is made more effective in terms of avoidance of unavailing streaming trials by providing a media presentation description which comprises at least one version at which the temporally-varying spatial scene is offered for tile-based streaming, with an indication of benefitting requirements for benefitting from the tile-based streaming the respective version of the temporally-varying spatial scene for each of the at least one version. By this measure, the retrieving device is able to match the benefitting requirements of the at least one version with a device capability of the retrieving device itself or of another device interacting with the retrieving device with respect to tile-based streaming. For instance, the benefitting requirements could relate to decoding capability requirements. That is, if the decoding power for decoding the streamed/retrieved media content would not suffice to decode all media segments needed to cover a view section of the temporally-varying spatial scene, then trying to stream and present the media content would be a waste of time, bandwidth and computational power and accordingly, it would be more effective to not try it in any case. The decoding capability requirements could, for instance, indicate a number of decoder instantiations necessitated for a respective version if, for instance, the media segments relating to a certain tile form a media stream such as a video stream, separate from media segments pertaining to another tile. The decoding capability requirement could, for instance, also pertain to further information such as a certain fraction of decoder instantiations needed to fit to a predetermined decoding profile and/or level, or could indicate a certain minimum capability of a user input device to move in a sufficiently fast manner a viewport/section via which the user sees the scene. Depending on the scene content, a low movement capability may not suffice for the user to look onto the interesting portions of the scene.

A further aspect of the present invention pertains to an extension of streaming of media content pertaining to temporally-varying spatial scenes. In particular, the idea in accordance with this aspect is that a spatial scene may in fact not only vary temporally but also in terms of at least one further parameter suggest, for instance, views and a position, view depth or some other physical parameter. The retrieving device may use adaptive streaming in this context by, depending on a viewport direction and the at least one further parameter, computing addresses of media segments, the media segments describing a spatial scene varying in time and the at least one parameter, and retrieving the media segments using the computed addresses from a server.

The above-outlined aspects of the present application and their advantageous implementations may be combined individually or all together.

BRIEF DESCRIPTION OF THE DRAWINGS

Embodiments of the present application are set forth below with respect to the Figures among which

DETAILED DESCRIPTION OF THE INVENTION

Figure 1:
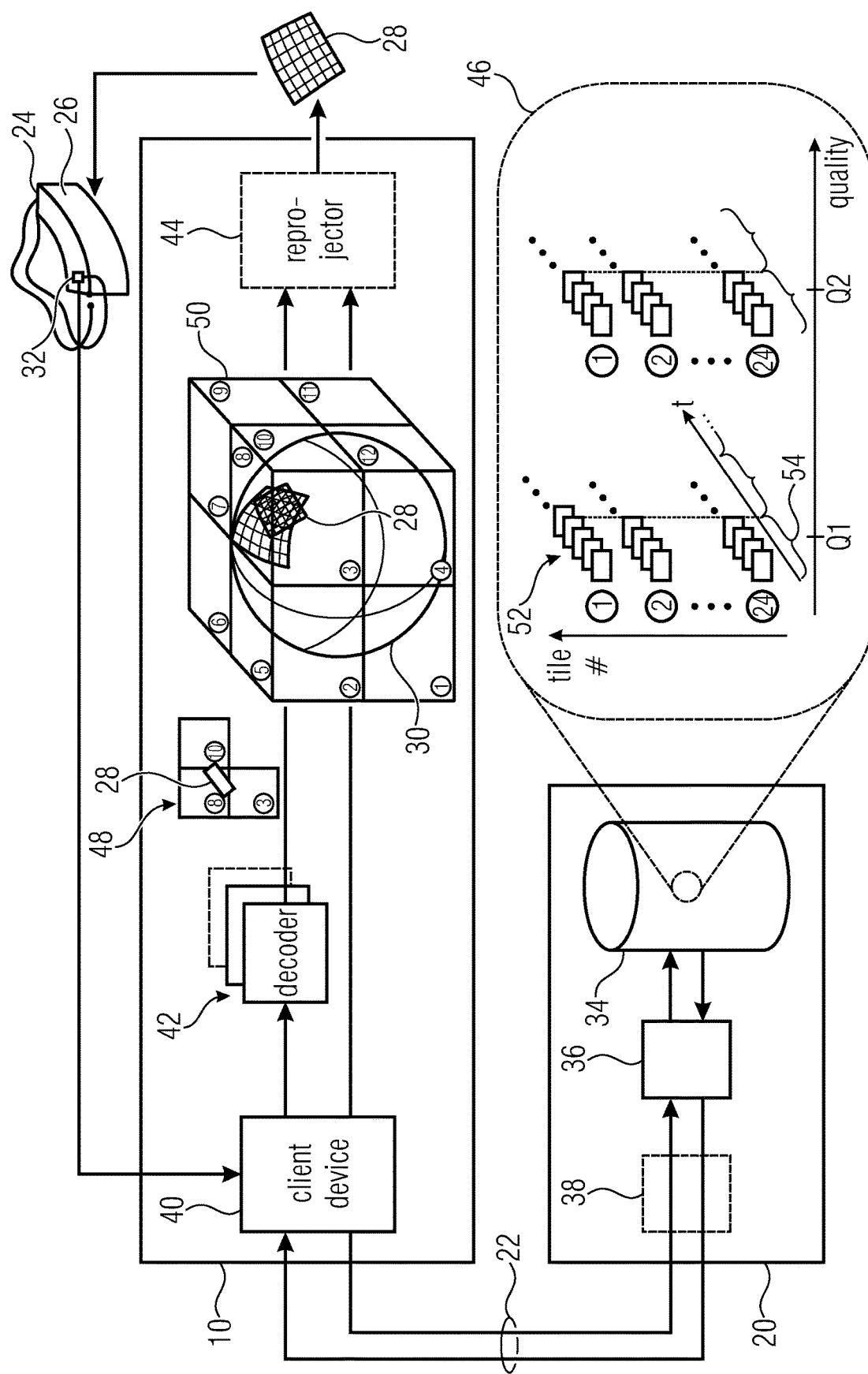
FIG. 1 shows a schematic diagram illustrating a system of client and server for virtual reality applications as an example as to where the embodiments set forth in the following figures may advantageously be used.

In order to ease the understanding of the description of embodiments of the present application with respect to the various aspects of the present application, FIG. 1 shows an example for an environment where the subsequently described embodiments of the present application may be applied and advantageously used. In particular, FIG. 1 shows a system composed of client 10 and server 20 interacting via adaptive streaming. For instance, dynamic adaptive streaming over HTTP (DASH) may be used for the communication 22 between client 10 and server 20. However, the subsequently outlined embodiments should not be interpreted as being restricted to the usage of DASH and likewise, terms such as media presentation description (MPD) should be understand as being broad so as to also cover manifest files defined differently than in DASH.

FIG. 1 illustrates a system configured to implement a virtual reality application. That is, the system is configured to present to a user wearing a head up display 24, namely via an internal display 26 of head up display 24, a view section 28 out of a temporally-varying spatial scene 30 which section 28 corresponds to an orientation of the head up display 24 exemplarily measured by an internal orientation sensor 32 such as an inertial sensor of head up display 24. That is, the section 28 presented to the user forms a section of the spatial scene 30 the spatial position of which corresponds to the orientation of head up display 24. In case of FIG. 1, the temporally-varying spatial scene 30 is depicted as an omni-directional video or spherical video, but the description of FIG. 1 and the subsequently explained embodiments are readily transferrable to other examples as well, such as presenting a section out of a video with a spatial position of section 28 being determined by an intersection of a facial access or eye access with a virtual or real projector wall or the like. Further, sensor 32 and display 26 may, for instance, be comprised by different devices such as remote control and corresponding television, respectively, or they may be part of a hand-held device such as a mobile device such as a tablet or a mobile phone. Finally, it should be noted that some of the embodiments described later on, may also be applied to scenarios where the area 28 presented to the user constantly covers the whole temporally-varying spatial scene 30 with the unevenness in presenting the temporally-varying spatial scene relating, for instance, to an unequal distribution of quality over the spatial scene.

Further details with respect to server 20, client 10 and the way the spatial content 30 is offered at server 20 is illustrated in FIG. 1 and described in the following. These details should, however, also not be treated as limiting the subsequently explained embodiments, but should rather serve as an example of how to implement any of the subsequently explained embodiments.

In particular, as shown in FIG. 1, server 20 may comprise a storage 34 and a controller 36 such as an appropriately programmed computer, an application-specific integrated circuit or the like. The storage 34 has media segments stored thereon which represent the temporally-varying spatial scene 30. A specific example will be outlined in more detail below with respect to the illustration of FIG. 1. Controller 36 answers requests sent by client 10 by re-sending to client 10 requested media segments, a media presentation description and may send to client 10 further information on its own. Details in this regard are also set out below. Controller 36 may fetch requested media segments from storage 34. Within this storage, also other information may be stored such as the media presentation description or parts thereof, in the other signals sent from server 20 to client 10.

As shown in FIG. 1, server 20 may optionally in addition comprise a stream modifier 38 modifying the media segments sent from server 20 to client 10 responsive to the requests from the latter, so as to result at client 10 in a media data stream forming one single media stream decodable by one associated decoder although, for instance, the media segments retrieved by client 10 in this manner are actually aggregated from several media streams. However, the existence of such a stream modifier 38 is optional.

Client 10 of FIG. 1 is exemplarily depicted as comprising a client device or controller 40 or more decoders 42 and a reprojector 44. Client device 40 may be an appropriately programmed computer, a microprocessor, a programmed hardware device such as an FPGA or an application specific integrated circuit or the like. Client device 40 assumes responsibility for selecting segments to be retrieved from server 20 out of the plurality 46 of media segments offered at server 20. To this end, client device 40 retrieves a manifest or media presentation description from server 20 first. From the same, client device 40 obtains a computational rule for computing addresses of media segments out of plurality 46 which correspond to certain, needed spatial portions of the spatial scene 30. The media segments thus selected are retrieved by client device 40 from server 20 by sending respective requests to server 20. These requests contain computed addresses.

The media segments thus retrieved by client device 40 are forwarded by the latter to the one or more decoders 42 for decoding. In the example of FIG. 1, the media segments thus retrieved and decoded represent, for each temporal time unit, merely a spatial section 48 out of the temporally-varying spatial scene 30, but as already indicated above, this may be different in accordance with other aspects, where, for instance, the view section 28 to be presented constantly covers the whole scene. Reprojector 44 may optionally re-project and cut-out the view section 28 to be displayed to the user out of the retrieved and decoded scene content of the selected, retrieved and decoded media segments. To this end, as shown in FIG. 1, client device 40 may, for instance, continuously track and update a spatial position of view section 28 responsive to the user orientation data from sensor 32 and inform reprojector 44, for instance, on this current spatial position of scene section 28 as well as the reprojection mapping to be applied onto the retrieved and decoded media content so as to be mapped onto the area forming view section 28. Reprojector 44 may, accordingly, apply a mapping and an interpolation onto a regular grid of pixels, for instance, to be displayed on display 26.

FIG. 1 illustrates the case where a cubic mapping has been used to map the spatial scene 30 onto tiles 50. The tiles are, thus, depicted as rectangular sub-regions of a cube onto which scene 30 having the form of a sphere has been projected. Reprojector 44 reverses this projection. However, other examples may be applied as well. For instance, instead of a cubic projection, a projection onto a truncated pyramid or a pyramid without truncation may be used. Further, although the tiles of FIG. 1 are depicted as being non-overlapping in terms of coverage of the spatial scene 30, the subdivision into tiles may involve a mutual tile-overlapping. And as will be outlined in more detail below, the subdivision of scene 30 into tiles 50 spatially with each tile forming one representation as explained further below, is also not mandatory.

Thus, as depicted in FIG. 1, the whole spatial scene 30 is spatially subdivided into tiles 50. In the example of FIG. 1, each of the six faces of the cube is subdivided into 4 tiles. For illustration purposes, the tiles are enumerated. For each tile 50, server 20 offers a video 52 as depicted in FIG. 1. To be more precise, server 20 even offers more than one video 52 per tile 50, these videos differing in quality Q#. Even further, the videos 52 are temporally subdivided into temporal segments 54. The temporal segments 54 of all videos 52 of all tiles T #form, or are encoded into, respectively, one of the media segments of the plurality 46 of media segments stored in storage 34 of server 20.

It is again emphasized that even the example of a tile-based streaming illustrated in FIG. 1 merely forms an example from which many deviations are possible. For instance, although FIG. 1 seems to suggest that the media segments pertaining to a representation of the scene 30 at a higher quality relate to tiles coinciding to tiles to which media segments belong which have the scene 30 encoded thereinto at quality Q1 this coincidence is not necessary and the tiles of different qualities may even correspond to tiles of a different projection of scene 30. Moreover, although not discussed so far, it may be that the media segments corresponding to different quality levels depicted in FIG. 1 differ in spatial resolution and/or signal to noise ratio and/or temporal resolution or the like.

Finally, differing from a tile-based streaming concept, according to which the media segments which may be individually retrieved by device 40 from server 20, relate to tiles 50 into which scene 30 is spatially subdivided, the media segments offered at server 20 may alternatively, for instance, each having the scene 30 encoded thereinto in a spatially complete manner with a spatially varying sampling resolution, however, having sampling resolution maximum at different spatial positions in scene 30. For instance, that could be achieved by offering at the server 20 sequences of segments 54 relating to a projecting of the scene 30 onto truncated pyramids the truncated tip of which would be oriented into mutually different directions, thereby leading to differently oriented resolution peaks.

Further, as to optionally present stream modifier 38, it is noted that same may alternatively be part of the client 10, or same may even be positioned inbetween, within a network device via which client 10 and server 20 exchange the signals described herein.

After having explained rather generally the system of server 20 and client 10, the functionality of client device 40 with respect to an embodiment in accordance with a first aspect of the present application as described in more detail. To this end, reference is made to FIG. 2 which shows device 40 in more detail. As already explained above, device 40 is for streaming media content pertaining to the temporally-varying spatial scene 30. As explained with respect to FIG. 1, device 40 may either be configured so that the media content streamed pertains continuously to the whole scene in spatial terms, or merely a section 28 thereof. In any case, device 40 comprises a selector 56 for selecting appropriate media segments 58 out of the plurality 46 of media segments available on server 20, and a retriever 60 for retrieving the selected media segments from server 20 by respective requests such as HTTP requests. As described above, selector 56 may use the media presentation description so as to compute the addresses of selected media segments with retriever 60 using these addresses in retrieving the selected media segments 58. For example, the computational rule to compute the addresses indicated in the media presentation description may depend on quality parameter Q, tile T and some temporal segment t. The addresses may be URLs, for instance.

Figure 2:
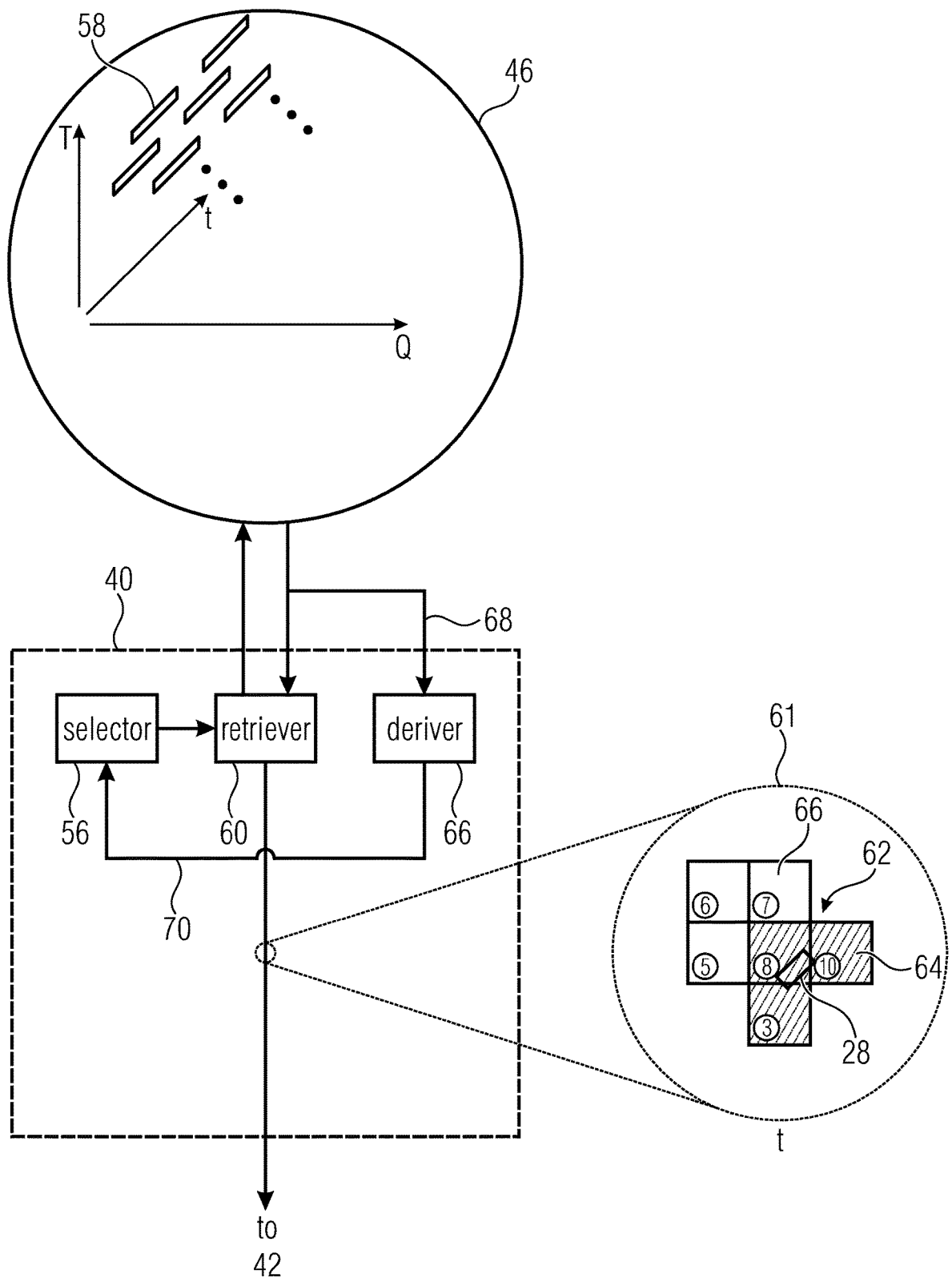
FIG. 2 shows a block diagram of a client device along with a schematic illustration of the media segment selection process in order to describe a possible mode of operation of the client device in accordance with an embodiment of the present application where the server 10 provides the device with information on acceptable or endurable quality variations within the media content presented to the user.

As has also been discussed above, the selector 56 is configured to perform the selection so that the selected media segments have at least a spatial section of the temporally-varying spatial scene and encoded thereinto. The spatial section may continuously cover the complete scene spatially. FIG. 2 illustrates at 61 the exemplary case where device 40 adapts the spatial section 62 of scene 30 to overlap and surround view section 28. This is, however, as already noted above, not necessarily the case and the spatial section may continuously cover the whole scene 30.

Further, selector 56 performs the selection such that the selected media segments have section 62 encoded thereinto in a manner of spatially unequal quality. To be more precise, a first portion 64, indicated by hatching in FIG. 2, of spatial section 62 is encoded into the selected media segment at a predetermined quality. This quality may, for instance, be the highest quality offered by server 20, or may be a "good" quality. Device 42 moves, for instance, or adapts the first portion 64 in a manner so as to spatially follow the temporally-varying view section 28. For instance, selector 56 selects the current temporal segments 54 of those tiles inheriting the current position of view section 28. In doing so, selector 56 may, optionally, as explained with respect to further embodiments hereinafter, keep the number of tiles making-up first portion 64 constant. In any case, a second portion 66 of section 62 is encoded into the selected media segments 58 at another quality such as a lower quality. For example, selector 56 selects the media segments corresponding to the current temporal segments of tiles spatially neighboring the tiles of portion 64 and belonging to the lower quality. For instance, selector 56 mainly selects the media segments corresponding to portion 66 for the sake of addressing the possible occasion where view section 28 moves too fast so as to leave portion 64 and overlap portion 66 before the temporal interval corresponding to the current temporal segment ends and selector 56 would be able to newly spatially arrange portion 64. In this situation, the portion of section 28 protruding into portion 66 may be presented to the user nevertheless, namely at reduced quality.

It is, not possible for device 40 to assess as to which negative quality degradation may result from preliminarily presenting to the user reduced quality scene content along with the scene content within portion 64 which is of the higher quality, to the user. In particular, a transition between these two qualities results which may be clearly visible to the user. At least, such transitions may be visible depending on the current scene content within section 28. The severity of the negative impact of such a transition within the view of the user is a characteristic of the scene content as offered by server 20 and may not be forecast by device 40.

Accordingly, in accordance with the embodiment of FIG. 2, device 40 comprises a deriver 66 deriving a predetermined relationship to be fulfilled between the quality of portion 64 and the quality of portion 66. Deriver 66 derives this predetermined relationship from information which may be contained in the media segments such as within transport boxes within the media segments 58 and/or contained in a signalization obtained from server 20 such as within the media presentation description or proprietary signals sent from server 20 such as SAND messages or the like. Examples as to how the information 68 would look like, are presented in the following. The predetermined relationship 70 derived by deriver 66 on the basis of information 68 is used by selector 56 in order to appropriately perform the selection.

For instance, the restriction in selecting the qualities of portions 64 and 66 compared to a completely independent selection of qualities for portion 64 and 66 influences a distribution of available bandwidth for retrieving the media contents concerning section 62 onto portions 64 and 66. In any case, selector 56 selects the media segments such that the qualities at which portions 64 and 66 are encoded into the media segments finally retrieved fulfill the predetermined relationship. Examples as to how the predetermined relationship might look are also set out below.

The media segments selected and finally retrieved by retriever 60 are finally forwarded to the one or more decoders 42 for decoding.

In accordance with a first example, for instance, the signaling mechanism embodied by information 68 involves information 68 indicating to device 40, which may be a DASH client, which quality combinations are acceptable for the offered video content. For example, the information 68 could be a list of quality pairs that indicate to the user or device 40 that the different regions 64 and 66 can be mixed with a maximum quality (or resolution) difference. Device 40 may be configured to inevitably use a certain quality level such as the highest one offered at sever 10, for portion 64 and derive quality levels at which portion 66 may be coded into the selected media segments from information 68 wherein same be contained in form of a list of quality levels for portion 68, for instance.

The information 68 could indicate an endurable value for a measure of a difference between the quality of portion 68 and the quality of portion 64. As a "measure" of the difference in quality, a quality index of the media segments 58, by way of which the same are distinguished in the media presentation description and by way of which the addresses of the same are computed using the computational rule described in the media presentation description, may be used. In MPEG-DASH, the corresponding attribute indicating the quality would be, for instance, at @qualityRanking. Device 40 could take the restriction in selectable quality level pairs at which portions 64 and 66 may be coded into the selected media segments into account in performing the selection.

However, instead of this difference measure, the difference in quality could alternatively be measured, for instance, in bit rate difference, i.e., an endurable difference in bit rate at which portions 64 and 66 are encoded into the corresponding media segments, respectively, assuming that the bit rate usually monotonically increases with increasing quality. The information 68 could indicate allowed pairs of options for qualities at which portions 64 and 66 are encoded into the selected media segments. Alternatively, the information 68 simply indicates allowed qualities for coding portion 66, thereby indirectly indicating allowed or endurable quality differences assuming that main portion 64 is encoded using some default quality such as, for instance, the highest quality possible or available. For instance, information 68 could be a list of acceptable representation IDs or could indicate a minimum bit rate level with respect to the media segments concerning portion 66.

However, a more gradual quality difference could alternatively be desired, wherein, instead of quality pairs, quality groups (more than two qualities) could be indicated, wherein, dependent on the distance to section 28, i.e., the viewport, the quality difference could be increased. That is, the information 68 could indicate the endurable value for the measure of a difference between the qualities for portion 64 and 66 in a manner depending on a distance to view section 28. This could be done by way of a list of pairs of a respective distance to the view section and a corresponding endurable value for the measure of the difference in quality beyond the respective distance. Below the respective distance, the quality difference has to be lower. That is, each pair would indicate for a corresponding distance that a part within portion 66, further away from section 28 than the corresponding distance, may have a quality difference to the quality of portion 64 exceeding the corresponding endurable value of this list entry.

The endurable value may increase within increasing distance to view section 28. The acceptance of the just discussed quality difference is often dependent on the time that these different qualities are shown to the user. For instance, content with a high quality difference might be acceptable if it is only shown for 200 microseconds, while content with a lower quality difference might be acceptable if it is shown for 500 microseconds. Therefore, in accordance with a further example, the information 68 could also include, in addition to the aforementioned quality combinations, for instance, or in addition to the allowed quality difference, a time interval for which the combination/quality difference may be acceptable. In other words, the information 68 may indicate an endurable or maximally allowed difference between the qualities of portions 66 and 64 along with an indication of a maximally allowed time interval for which portion 66 may be shown within the view section 28 concurrently with portion 64.

As already noted previously, the acceptance of quality differences depends on the content itself. For instance, the spatial position of the different tiles 50 has an influence on the acceptance. Quality differences in a uniform background region with low frequency signals are expected to be more acceptable than quality differences in a foreground object. Furthermore, the position in time also has an influence on the acceptance rate due to changing content. Therefore, according to another example, signals forming information 68 are sent to device 40 intermittently such as, for instance, per representation or period in DASH. That is, the predetermined relationship indicated by information 68 may be intermittently updated. Additionally and/or alternatively, the signaling mechanism realized by information 68 may vary in space. That is, the information 68 may be made spatially dependent such as, by way of an SRD parameter in DASH. That is, different predetermined relationships may be indicated by information 68 for different spatial regions of scene 30.

Figure 3:
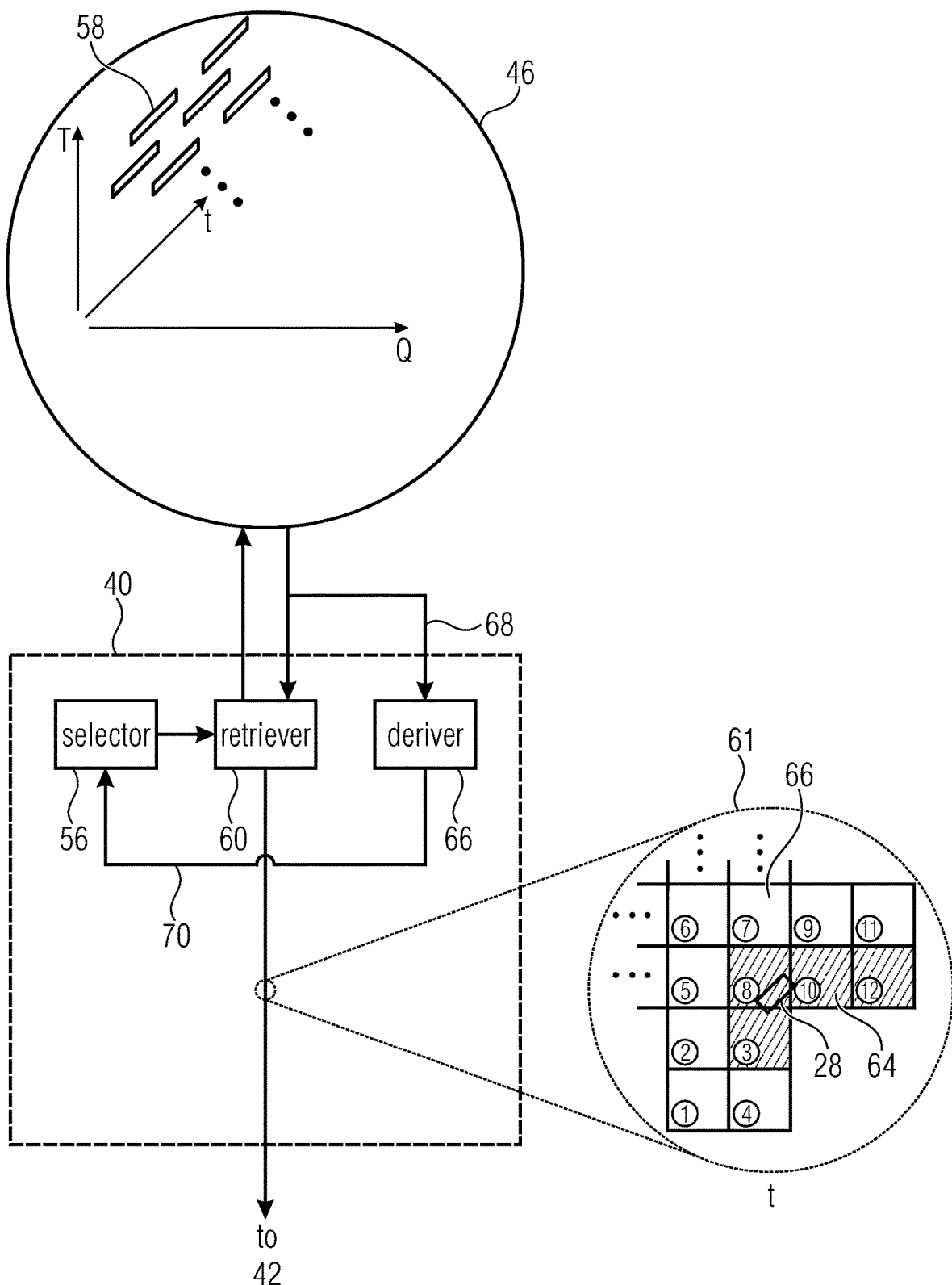
FIG. 3 shows a modification of FIG. 2, the portion of increase quality does not concern the portion tracking the view section of viewport, but a region of interest of the media scene content as signaled from server to client.

The embodiment of device 40, as described with respect to FIG. 2, pertains to the fact that device 40 wants to keep quality degradations, due to pre-fetched portions 66, within the retrieved section 62 of video content 30 briefly being visible in section 28 before being able to change the position of section 62 and portion 64 so as to adapt the same to the change in position by section 28, as low as possible. That is, in FIG. 2, portions 64 and 66, the qualities of which were restricted as far as their possible combinations were concerned by way of information 68, were different portions of section 62 with a transition between both portions 64 and 66 being continuously shifted or adapted in order to track or run-ahead the moving view section 28. In accordance with an alternative embodiment shown in FIG. 3, device 40 uses information 68 in order to control possible combinations of qualities of portions 64 and 66 which, however, in accordance with the embodiment of FIG. 3, are defined to be portions differentiated or distinguished from one another in a manner defined, for instance, in the media presentation description, i.e., defined in a manner independent from a position of view section 28. The positions of portions 64 and 66 and the transition there between may be constant or vary in time. If varying in time, the variation is due to a change in content of scene 30. For example, portion 64 would correspond to a region of interest for which the expenditure of higher quality is worthwhile, while portion 66 is a portion for which quality reduction owing to low bandwidth conditions, for instance, should be considered prior to considering quality reductions for portion 64.

Figure 4:
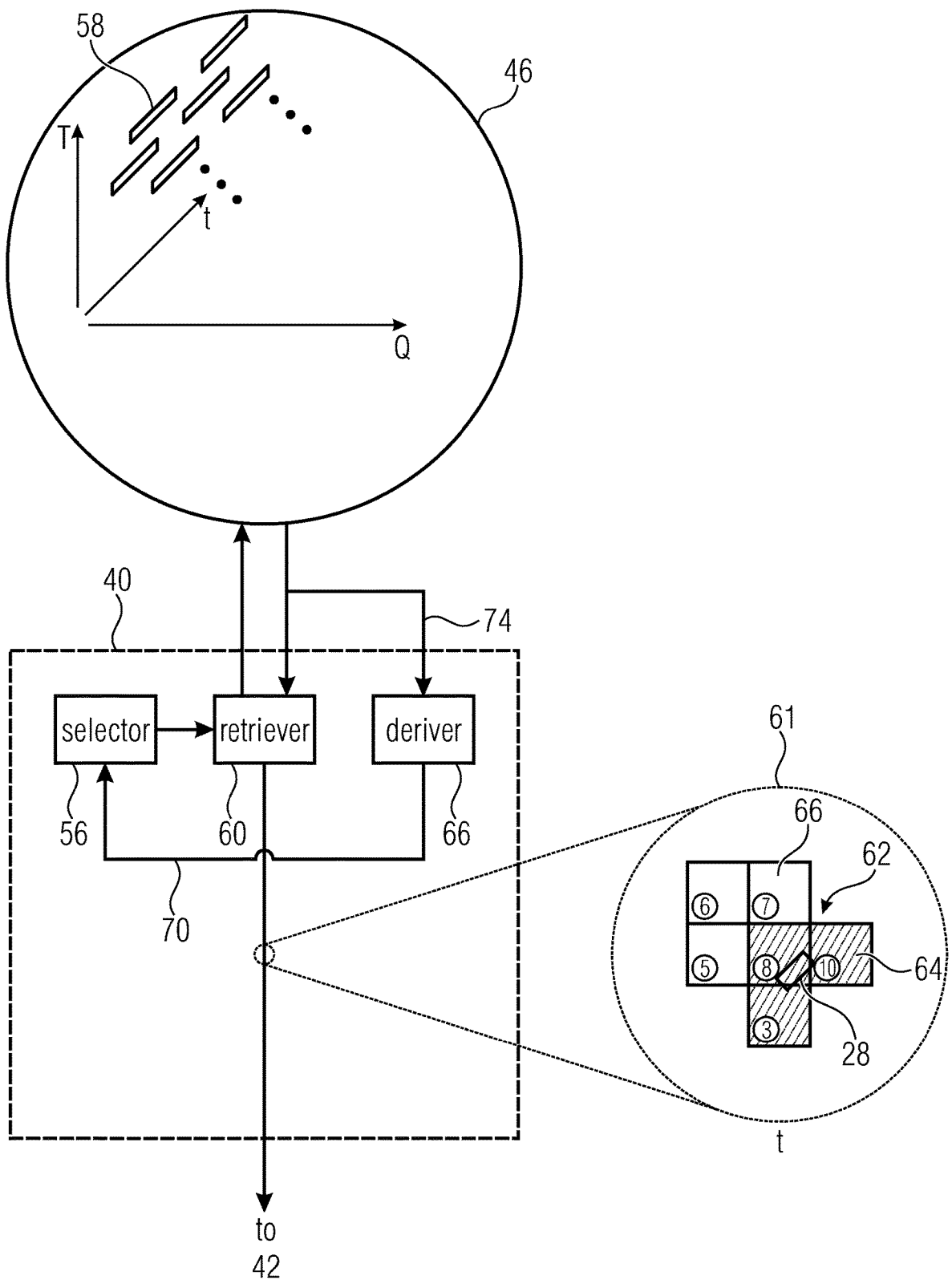
FIG. 4 shows a block diagram of the client device along with a schematic illustration of the media segment selection process in accordance with an embodiment where the server provides information on how to set a size, or size and/or position, of the portion of increased quality or the size, or size and/or position, of the actually retrieved section of the media scene.

In the following, a further embodiment for an advantageous implementation of device 40 is described. In particular, FIG. 4 shows device 40 in a manner corresponding, in structure, to FIGS. 2 and 3 but the mode of operation is changed so as to correspond to a second aspect of the present application.

That is, device 40 comprises a selector 56, a retriever 60 and a deriver 66. The selector 56 selects from the media segments 58 of the plurality 46 offered by server 20 and retriever 60 retrieves the selected media segments from the server. FIG. 4 presumes that device 40 operates as depicted and illustrated with respect to FIGS. 2 and 3, namely that selector 56 performs the selection so that the selected media segments 58 have a spatial section 62 of scene 30 encoded thereinto in a manner where this spatial section follows view section 28 which varies its spatial position in time. However, a variant corresponding to the same aspect of the present application is described later on with respect to FIG. 5, wherein, for each time instant t, the selected and retrieved media segments 58 have the whole scene or a constant spatial section 62 encoded thereinto.

Figure 6:
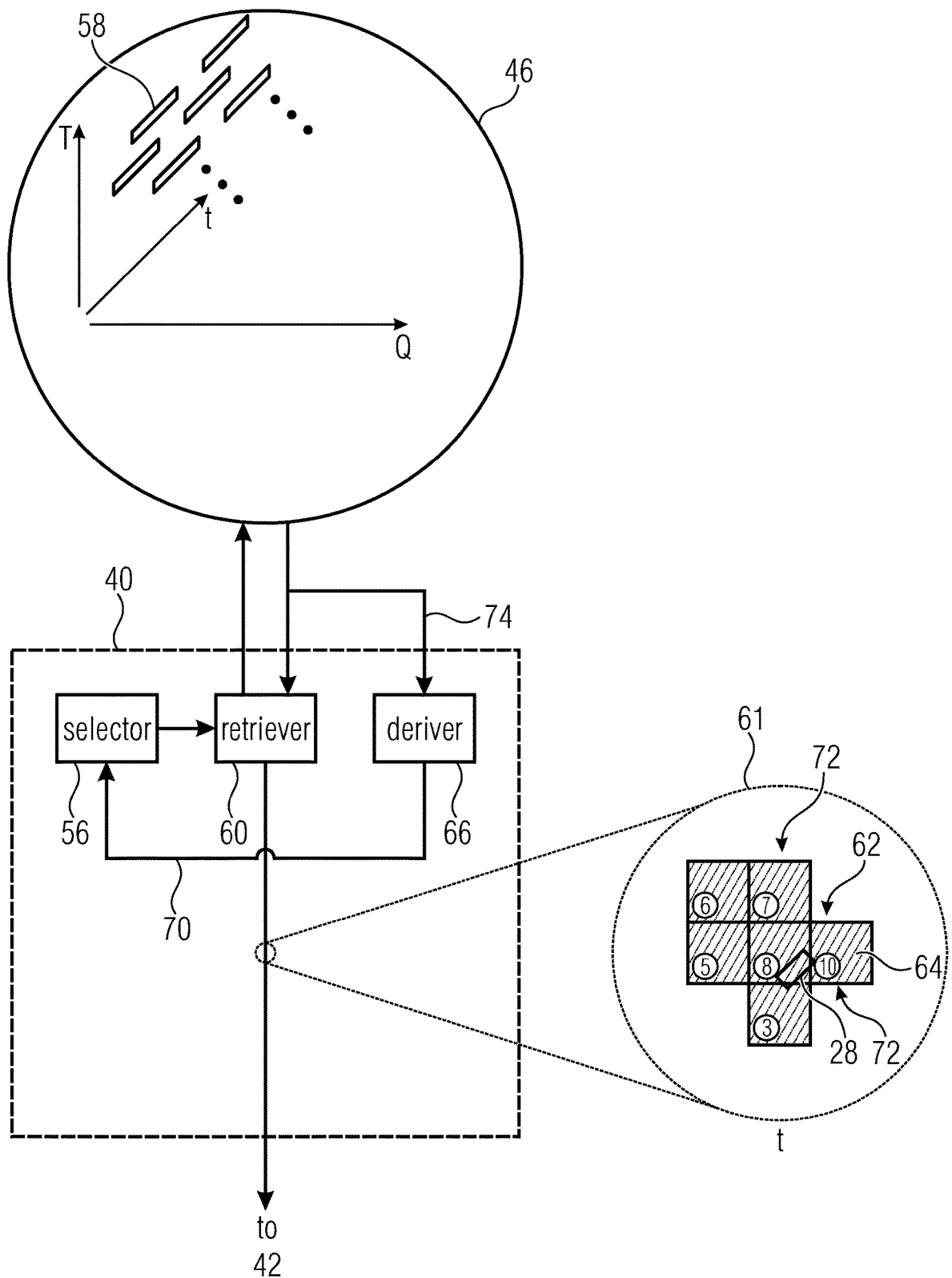
FIG. 6 shows a variant of FIG. 4 according to which the retrieved section has the predetermined quality and its size is determined by the information stemming from the server.

In any case, selector 56 selects, similar to the description with respect to FIGS. 2 and 3, the media segments 58 such that a first portion 64 within section 62 is encoded into the selected and retrieved media segments at a predetermined quality, whereas a second portion 66 of section 62, which spatially neighbors the first portion 64, is encoded into the selected media segments at a reduced quality relative to the predetermined quality of portion 64. A variant where selector 56 restricts the selection and retrieval to media segments pertaining to a moving template tracking the position of viewport 28 and wherein the media segments have encoded thereinto the section 62 completely at the predetermined quality so that the first portion 64 completely covers section 62 while being surrounded by non-encoded portion 72 is depicted in FIG. 6. In any case, selector 56 performs the selection so that the first portion 64 follows the view section 28 which varies in spatial position temporally.

In such a situation, it is also not easy to forecast by client 40 as to how large section 62 or portion 64 should be. Depending on the scene content, most users may act similarly in moving view section 28 across scene 30 and, accordingly, the same applies to the interval of view section 28 speeds at which view section 28 may presumably move across scene 30. Accordingly, in accordance with the embodiment of FIGS. 4 to 6, information 74 is provided by server 20 to device 40 so as to assist device 40 in setting a size, or size and/or position, of the first portion 64, or the size, or size and/or position, of section 62, respectively, dependent on the information 74. With respect to the possibilities of transmitting information 74 from server 20 to device 40, the same applies as described above with respect to FIGS. 2 and 3. That is, the information may be contained within the media segments 58 such as within event boxes thereof, or a transmission within the media presentation description or proprietary messages sent from server to device 40, such as SAND messages, may be used to this end.

Figure 5:
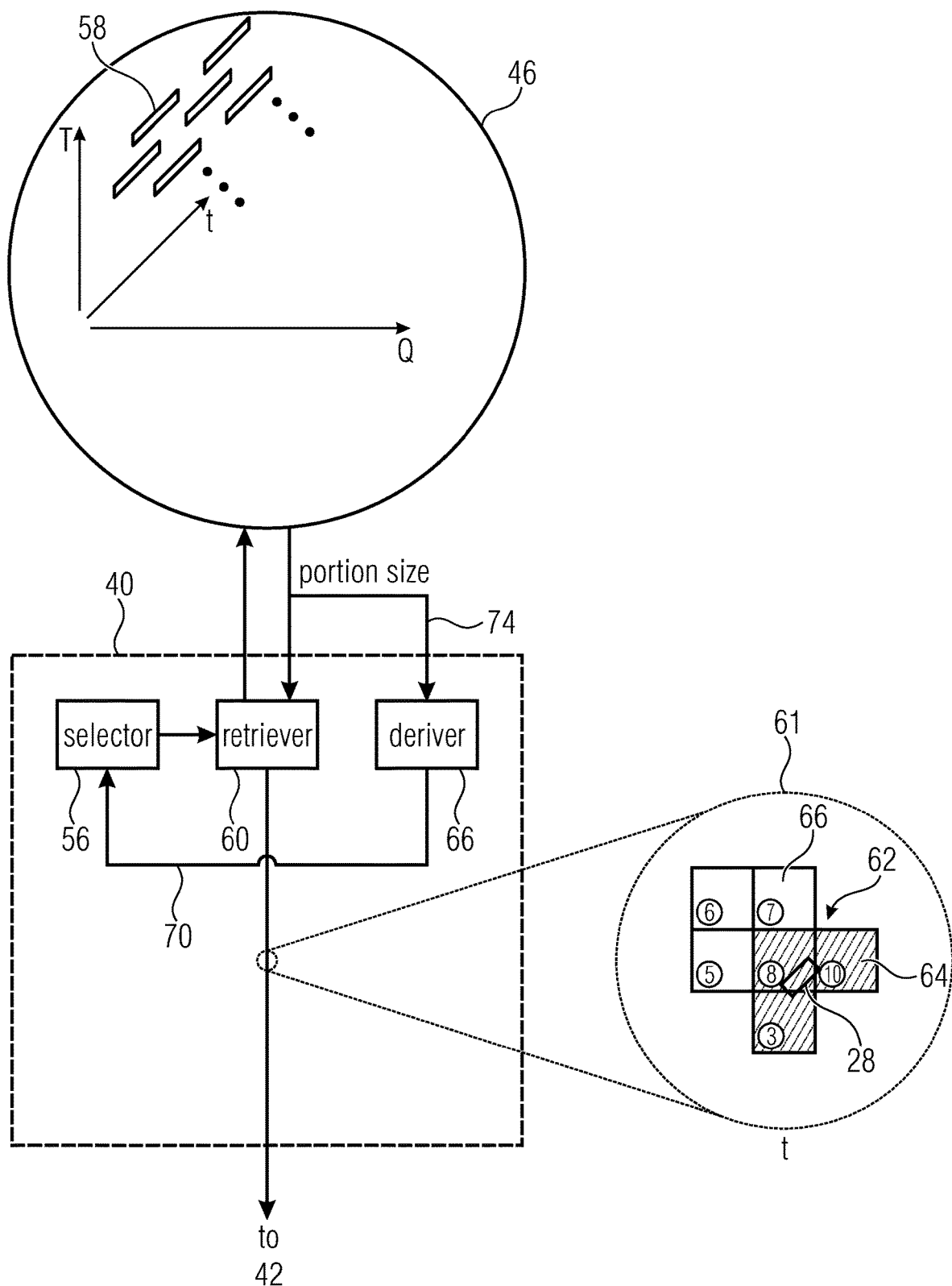
FIG. 5 shows a variant of FIG. 5 in that information sent by the server directly indicates the size of portion 64, rather than scaling it depending on expected movements of the viewport.

That is, in accordance with the embodiments of FIGS. 4 to 6, selector 56 is configured to set a size of the first portion 64 depending on information 74 stemming from server 20. In the embodiments illustrated in FIGS. 4 to 6, the size is set in units of tiles 50, but, as already described above with respect to FIG. 1, the situation may be slightly different when using another concept of offering scene 30 in spatially varying quality at server 20.

In accordance with an example, information 70 could, for instance, include a probability for a given movement speed of viewport of view section 28. Information 74 could, as already denoted above, result within the media presentation description made available for client device 40 which may, for instance, be a DASH client, or some in-band mechanisms may be used to convey information 74 such as event boxes, i.e., EMSG or SAND messages in case of DASH. The information 74 could also be included in any container format such as ISO file format or transport format beyond MPEG-DASH such as MPEG-2TS. It could also be conveyed in the video bitstream such as in SEI messages as described later. In other words, the information 74 may indicate a predetermined value for a measure of a spatial speed of view section 28. In this manner, the information 74 is indicative of the size of portion 64 in the form of a scaling, or in the form of an increment relative to a size of view section 28. That is, information 74 starts from some "base size" for portion 64 used to cover the size of section 28 and increases this "base size" appropriately such as incrementally or by scaling. For example, the aforementioned movement speed of view section 28 could be used to correspondingly scale the circumference of a current position of view section 28 so as to determine, for instance, the furthest positions of the circumference of view section 28 along any spatial direction feasible after this time interval, for example, determining the latency in adjusting the spatial location of portion 64 such as, for instance, the time duration of the temporal segments 54 corresponding to the temporal length of media segments 58. The speed times this time duration adds to the circumference of a current position of viewport 28, omni-directional, could thus result into such a worst case circumference and could be used to determine an enlargement of portion 64 relative to some minimum expansion of portion 64 assuming a non-moving viewport 28.

Information 74 may even be related to an evaluation of statistics of user behavior. Later on, embodiments are described which are suitable for feeding such an evaluation process. For instance, information 74 could indicate maximum speeds with respect to certain percentages of users. For example, information 74 could indicate that 90% of users move at a speed lower than 0.2 rad/s and 98% of users move at a speed lower than 0.5 rad/s. The information 74 or the messages carrying the same could be defined in such a way that probability-speed pairs are defined or a message could be defined that signals the maximum speed for a fixed percentage of users, e.g., for 99% of the users. The movement speed signaling 74 could additionally comprise directional information, i.e., an angle in 2D or 2D plus depth in 3D also known as light field application. Information 74 would indicate different probability-speed pairs for different movement directions.

In other words, information 74 may apply to a given time span such as, for instance, the temporal length of a media segment. It may consist of trajectory-based (x percentile, average user path) or velocity-based pairs (x percentile, speed) or distance-based pairs (x percentile, aperture/diameter/advantageous) or area-based pairs (x percentile, recommended area) or single maximal boundary values for path, velocity, distance or advantageous area. Instead of relating the information to percentiles, a simple frequency ranking could be done according to most of the users move at a certain speed, second most users move at a further speed and so on. Additionally or alternatively, information 74 is not restricted to indicate the speed of view section 28, but could likewise indicate an advantageous area to be viewed respectively to direct the portion 62 and/or 64 which is sought to track view section 28 to, with or without an indication about statistical significance of the indication such as percentage of users having complied with that indication or indication of whether the indication coincides with the user viewing speeds/view sections having been logged most often, and with or without temporal persistence of the indication. Information 74 could indicate another measure of the speed of view section 28, such as a measure for a travelling distance of view section 28 within a certain period in time, such as within a temporal length of the media segments or, in more detail, the temporal length of temporal segments 54. Alternatively, information 74 could be signaled in a manner distinguishing between certain directions of movement into which view section 28 may travel. This pertains to both an indication of speed or velocity of view section 28 into a certain direction as well as the indication of traveled distance of view section 28 with respect to a certain direction of movement. Further, the expansion of portion 64 could be signaled by way of information 74 directly, either omni-directionally or in a manner discriminating different movement directions. Furthermore, all of the just outlined examples may be modified, in that the information 74 indicates these values along with a percentage of users for which these values suffice in order to account for their statistical behavior in moving view section 28. In this regard, it should be noted that the view speed, i.e., the speed of view section 28 may be considerable and is not restricted to speed values for a user head, for instance. Rather, the view section 28 could be moved depending on the user's eye movement, for instance, in which case the view speed may be considerably larger. The view section 28 could also be moved according to another input device movement such as according to the movement of a tablet or the like. As all these "input possibilities" enabling the user to move section 28 result in different expected speeds of view section 28, information 74 may even be designed such that it distinguishes between different concepts for controlling the movement of view section 28. That is, information 74 could indicate or be indicative of the size of portion 64 in a manner indicating different sizes for different ways of controlling the movement of view section 28 and device 40 would use the size indicated by information 74 for the correct view section control. That is, device 40 gains knowledge about the way view section 28 is controlled by the user, i.e., checks whether view section 28 is controlled by head movement, eye movement or tablet movement or the like and sets the size in accordance with that part of information 74 which corresponds to this kind of view section control.

Generally, the movement speed can be signaled per content, period, representation, segment, per SRD position, per pixel, per tile, e.g., on any temporal or spatial granularity or the like. The movement speed can also be differentiated in head movement and/or eye movement, as just outlined. Further, the information 74 about user movement probability may be conveyed as a recommendation about high resolution prefetch, i.e., video area outside user viewport, or spherical coverage.

Figure 7A:
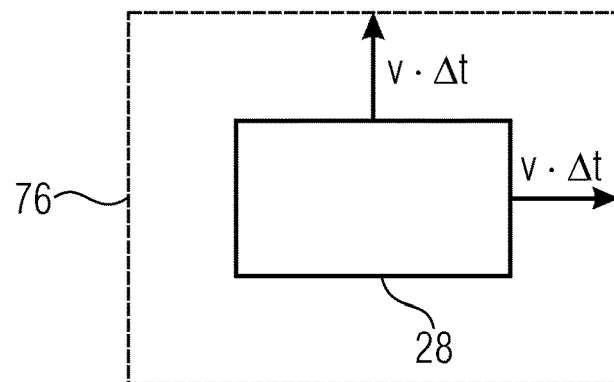
FIGS. 7a to 7c show schematic diagrams illustrating the manner in which the information 74 according to FIGS. 4 and 6 increases the size of the portion retrieved at the predetermined quality via a corresponding enlargement of the size of the viewport.
Figure 7B:
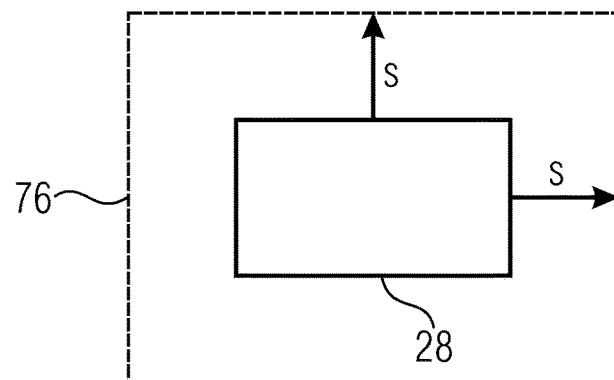
Figure 7C:
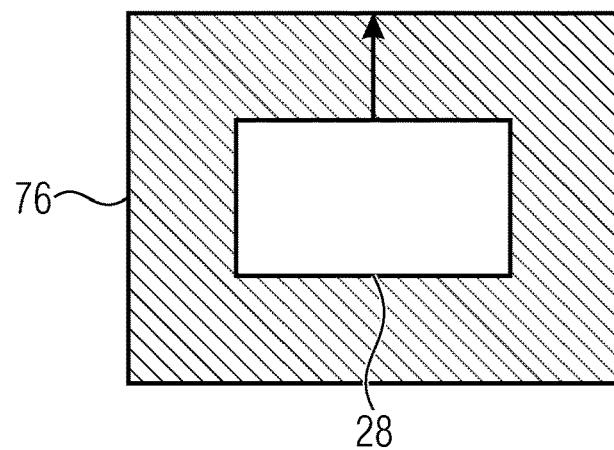

FIG. 7*a* to FIG. 7*c* briefly summarize some of the options explained with respect to information 74 in the way it is used by device 40 to amend the size of portion 64 or portion 62, respectively, and/or the position thereof. In accordance with the option shown in FIG. 7*a*, device 40 enlarges the circumference of section 28 by a distance corresponding to a product of the signaled speed v and the time duration Δt, which may correspond to the time period which corresponds to the temporal length of the temporal segments 54 encoded in the individual media segments 50*a*. Additionally and/or alternatively, the position of portion 62 and/or 64 may be placed the farther away from a current position of section 28, or the current position of portion 62 and/or 64 into direction of the signaled speed or movement as signaled by information 74, the larger the speed is. The speed and direction may be derived from surveying or extrapolating a recent development or change in recommended area indication by information 74. Instead of omni-directionally applying v×Δt, the speed may be signaled by information 74 different for different spatial directions. The alternative depicted in FIG. 7*d* shows that information 74 may indicate the distance of enlarging the circumference of view section 28 directly, with this distance being indicated by parameter s in FIG. 7*b*. Again, a directionally varying enlargement of section may be applied. FIG. 7*c* shows that the enlargement of the circumference of section 28 could be indicated by information 74 by area increase such as, for instance, in the form of the ratio of the area of the enlarged section compared to the original area of section 28. In any case, the circumference of area 28, after enlargement, indicated by 76 in FIGS. 7*a* to 7*c* could be used by selector 56 to dimension or set the size of portion 64 such that portion 64 covers the whole area within enlarged section 76 on at least a predetermined amount thereof. Obviously, the larger section 76, the larger the number of tiles, for instance, is within portion 64. In accordance with a further alternative, section 74 could indicate the size of portion 64 directly such as in the form of number of tiles making up portion 64.

The latter possibility of signaling the size of portion 64 is depicted in FIG. 5. The embodiment of FIG. 5 could be modified in the same manner as the embodiment of FIG. 4 was modified by the embodiment of FIG. 6, i.e., the complete area of section 62 could be fetched from server 20 by way of segments 58 at the quality of portion 64.

In any case, at the very end of FIG. 5, information 74 distinguishes between different sizes of view section 28, i.e., between different field of views seen by view section 28. Information 74 simply indicates the size of portion 64 depending on the size of view section 28 which device 40 currently aims at. This enables the service of server 20 to be used by devices with different field of views or different sizes of view section 28 without devices such as device 40 having to cope with the problem of computing or otherwise guessing the size of portion 64 so that portion 64 suffices to cover view section 28 irrespective of any movement of section 28 as discussed with respect to FIGS. 4, 6 and 7. As may have become clear from the description of FIG. 1, it is all but easy to assess as to which constant number of tiles, for instance, may suffice to completely cover a certain size of view section 28, i.e., a certain field of view, irrespective of the view section 28's direction for spatial positioning 30. Here, information 74 alleviates this situation and device 40 is able to simply look-up within information 74 the value of the size of portion 64 to be used for the size of view section 28 applying to device 40. That is, in accordance with the embodiment of FIG. 5, the media presentation description made available for the DASH client or some in-bent mechanisms, such as event boxes or SAND messages, could include information 74 about the spherical coverage or field of view of sets of representations or sets of tiles, respectively. One example could be a tiled offering with M representations as depicted in FIG. 1. The information 74 could indicate the recommended number n<M of tiles (called representations) to download for coverage of a given end device field of view, e.g., out of a cubic representation tiled into 6×4 tiles as depicted in FIG. 1, 12 tiles are deemed sufficient to cover a 90°×90° field of view. Due to the end device field of view not always being perfect aligned with the tile boundaries, this recommendation cannot be trivially generated by device 40 on its own. Device 40 may use information 74 by downloading, for instance, at least N tiles, i.e., the media segments 58 concerning N tiles. Another way to utilize the information would be to emphasize the quality of N tiles within section 62 that are closest to the current view center of the end device, i.e., use N tiles for making up portion 64 of section 62.

Figure 8A:
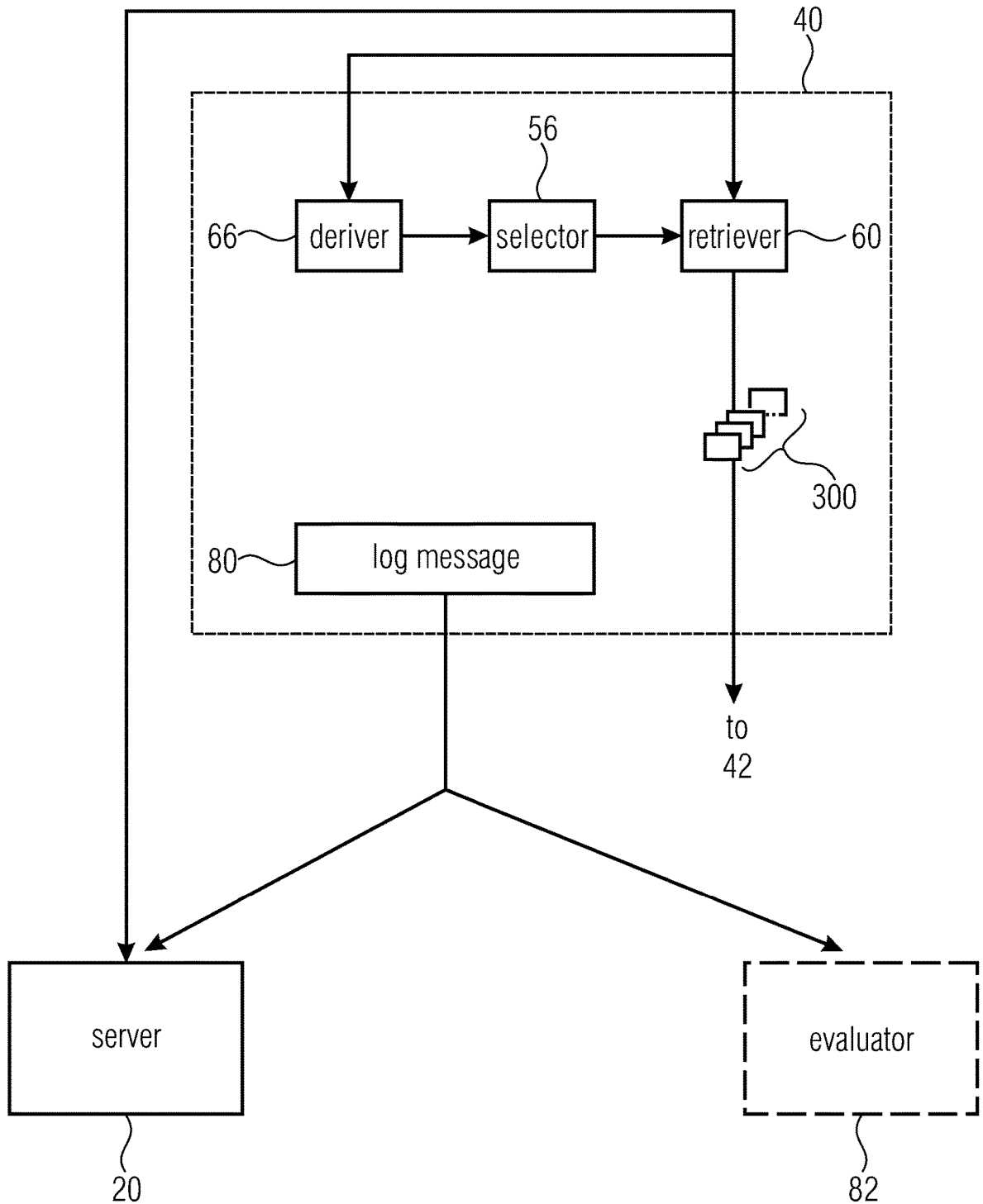
FIG. 8a shows a schematic diagram illustrating an embodiment where client device sends log messages to server or a certain evaluator for evaluating these log messages so as to derive thereof appropriate settings, for instance, for the types of information discussed with respect to FIGS. 2 to 7c.

With respect to FIG. 8a, an embodiment with respect to a further aspect of the present application is described. Here, FIG. 8a shows client device 10 and server 20 which communicate with each other in accordance with any of the possibilities described above with respect to FIGS. 1 to 7. That is, device 10 may be embodied in accordance with any of the embodiments descried with respect to FIGS. 2 to 7 or may simply act without these specifics in the manner described above with respect to FIG. 1. However, favorably, device 10 is embodied in accordance with any of the embodiments described above with respect to FIGS. 2 to 7 or any combination thereof and additionally inherits the mode of operation described now with respect to FIG. 8a. In particular, device 10 is internally construed as has been described above with respect to FIGS. 2 to 8, i.e., device 40 comprises selector 56, retriever 60 and, optionally, deriver 66. Selector 56 performs the selection for aiming at unequal streaming, i.e., selecting the media segments in a manner so that the media content is encoded into the selected and retrieved media segments in a manner so that the quality spatially varies and/or in a manner so that there are non-encoded portions. However, in addition to this, device 40 comprises a log message sender 80 which sends-out to server 20 or an evaluation device 82 log messages logged in, for instance,

- a momentaneous measurement or a statistical value measuring a spatial position and/or movement of the first portion 64,
- a momentaneous measurement or a statistical value measuring a quality of the temporally-varying spatial scene as far as encoded into selected media segments and as far as visible in view section 28, and/or
- a momentaneous measurement or a statistical value measuring the quality of the first portion or a quality of the temporally-varying spatial scene 30 as far as encoded into the selected media segments and as far as visible in view section 28.

The motivation is as follows.

In order to be able to derive statistics, such as the most interesting regions or speed-probability pairs, as described previously, reporting mechanisms from users are used. Additional DASH Metrics to the ones defined in Annex D of ISO/IEC23009-1 are used.

One metric would be the FoV of Client as DASH Metric, where DASH clients send back to a Metric Server (it could be the same as the DASH server or another one) the characteristics of the end device in term of FoV.

| Key | Type | Description |
| --- | --- | --- |
| EndDeviceFoVH | Integer | Horizontal FoV of end device in degree |
| EndDeviceFoVV | Integer | Vertical FoV of end device in degree |

One Metric would be ViewportList, where DASH clients send back to a Metric Server (it could be the same as the DASH server or another one) the viewport watched by each client in time. An instantiation of such a message could be as follows:

| Key | Type | Description |
| --- | --- | --- |
| ViewportList | List | List of Viewport over time |
| Entry | Object | An entry for a single Viewport |
| time | Integer | Playout-time (media-time) at which the following viewport is chosen by the client. |
| roll | Integer | The roll component of the orientation of the Viewport |
| pitch | Integer | The pitch coordinate of the orientation of the Viewport |
| yaw | Integer | The yaw coordinate of the orientation of the Viewport |

For the Viewport (region of interest) message, the DASH client could be asked to report whenever a Viewport change occurs, with potentially a given granularity (with or without avoiding reporting of very small movements) or with a given periodicity. Such a message could be included in the MPD as an attribute @reportViewPortPeriodicity or an element or descriptor. It could be also indicated out of band, such as with a SAND message or any other means.

Viewport can also be signalled on tile granularity.

Additionally or alternatively, log messages could report on other current scene related parameters changing responsive to user input, such as any of the parameters discussed below with respect to FIG. 10 such as current user distance from the scene centre and/or the current view depth.

Another metric would be the ViewportSpeedList, where DASH clients indicate the movement speed for a given viewport in time when a movement happens.

| Key | Type | Description |
| --- | --- | --- |
| ViewportSpeedList | List | List of Viewport change speed over time |
| Entry | Object | An entry for a single Viewport change speed |
| time | Integer | Playout-time (media-time) at which the following viewport is chosen by the client. |
| roll | Integer | The roll component of the orientation of the Viewport |
| pitch | Integer | The pitch coordinate of the orientation of the Viewport |
| yaw | Integer | The yaw coordinate of the orientation of the Viewport |
| speed_roll | Integer | The speed in roll component of the orientation of the Viewport |
| speed_pitch | Integer | The speed in pitch component of the orientation of the Viewport |
| speed_yaw | Integer | The speed in yaw component of the orientation of the Viewport |

This message would be sent only if the client performs a viewport movement. However, the server could, as well as for the previous case, indicate that the message should be only sent if the movement is significant. Such a configuration could be something like @minViewportDifferenceForReporting signalling the size in pixels or angle or any other magnitude that needs to have changed for a message to be sent.

Another important thing for a VR-DASH service, where asymmetric quality is offered as described above, is to evaluate how fast users switch from an asymmetric representation or a set of unequal quality/resolution representations for a Viewport to another representation or set of representation more adequate for another viewport. With such a metric, Servers could derive statistics that help them to understand relevant factors that impact the QoE. Such a metric could look like:

| Key | Type | Description |
| --- | --- | --- |
| LowQualityDurationAtSwitchList | List | List of time intervals used to switch from the low quality content to the high quality content in the VR-DASH service. How long the low quality content has been played for a new Viewport before the high quality content for the new Viewport is available. |
| Entry | Object | An entry for a single interval duration of the switch to high-quality content for another Viewport |
| time | Integer | Playout-time (media-time) at which the following viewport is chosen by the client. |
| duration | Integer | The duration of the playback of the low quality version of the new Viewport when a Viewport change occurs |

Alternatively, the duration described before could be given as an average:

| Key | Type | Description |
| --- | --- | --- |
| LowQualityAvgDurationAtSwitch List | List | Average of time intervals used to switch from the low quality content to the high quality content in the VR-DASH service. How long the long quality content has been played for a new Viewport before the high quality content for the new Viewport is available. |
| avgDuration | Integer | The average duration of the playback of the low quality version of the new Viewport when a Viewport change occurs |

All of these metrics could additionally have the time at which the measurement has been performed, as for other DASH Metrics.

| t | Real-Time | Time of the measurement of the parameter. |
| --- | --- | --- |

In some cases, it could happen that if unequal quality content is downloaded and bad quality (or a mixture of good and bad quality) is shown for a long enough time (which could be only a couple of seconds) the user is unhappy and leaves the session. Conditional to leaving the session the user could send a message of the quality shown in the last x time-interval:

| Key | Type | Description |
| --- | --- | --- |
| ShownQualityList | List | List of Quality shown in the last time. |
| Entry | Object | An entry for a single interval duration of the shown quality |
| duration | Integer | Duration of the reported quality. |
| quality | comma-separated quality rank values | The quality rank values of the viewport |

Alternatively, a max-quality difference could be reported or the max_quality and min_quality of the viewport As became clear from the above description relating to FIG. 8a, in order for a tile-based DASH streaming service operator to set up and optimize its service in a meaningful fashion (e.g. with respect to resolution ratios, bitrates and segment durations) it is advantageous if the service operator is able to derive statistics which uses client reporting mechanisms examples of which were described above. Additional DASH Metrics to the ones defined above and in addition to Annex D of [A1] are set out hereinafter.

Figure 8B:
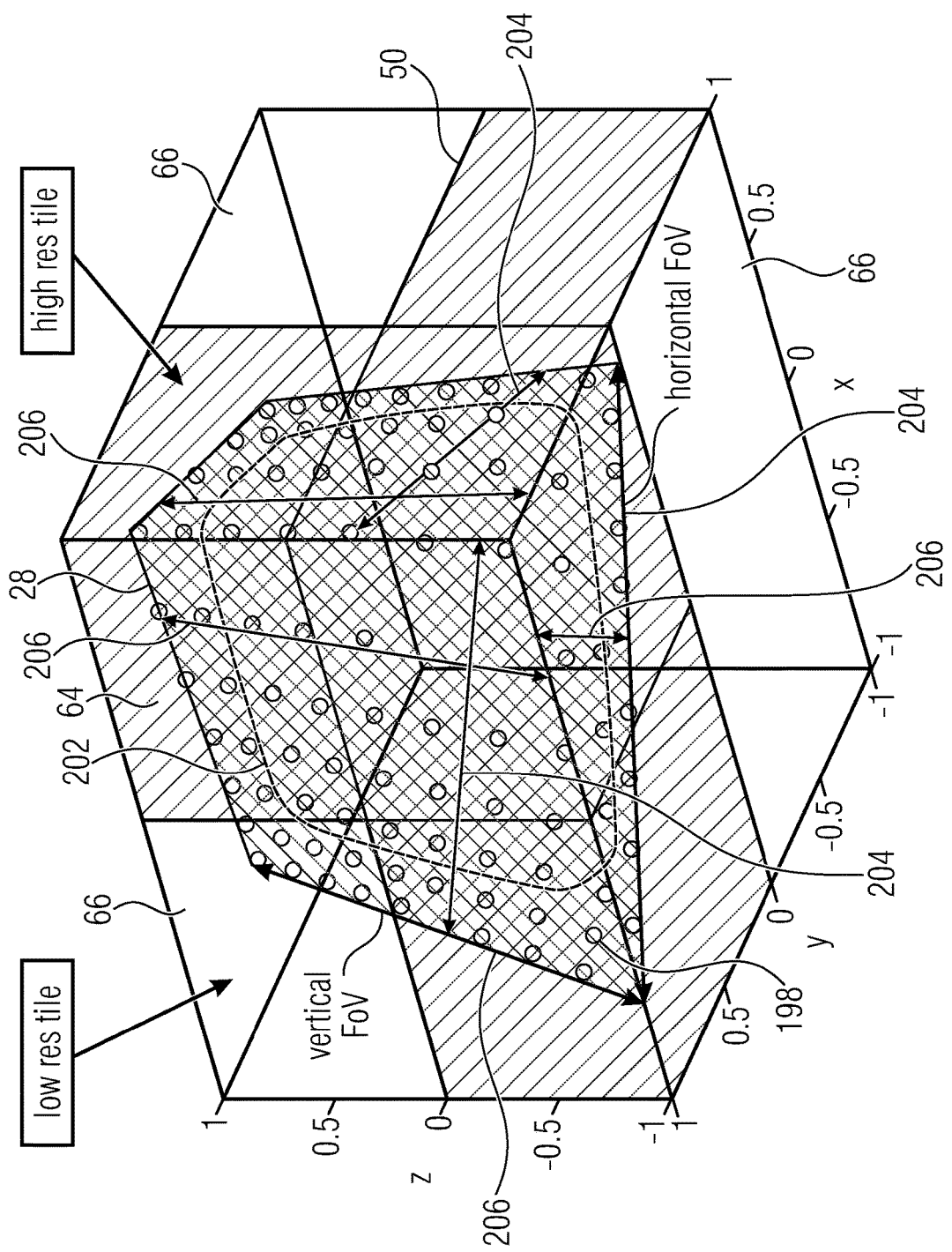
FIG. 8b shows a schematic diagram of a tile-based cubic projection of a 360 scene onto the tiles and an example of how some of the tiles are covered by an exemplary position of a viewport. The small circles indicate positions in the viewport equiangularly distributed, and hatched tiles are encoded at higher resolution in the downloaded segments than tiles without hatching.
Figure 8C:
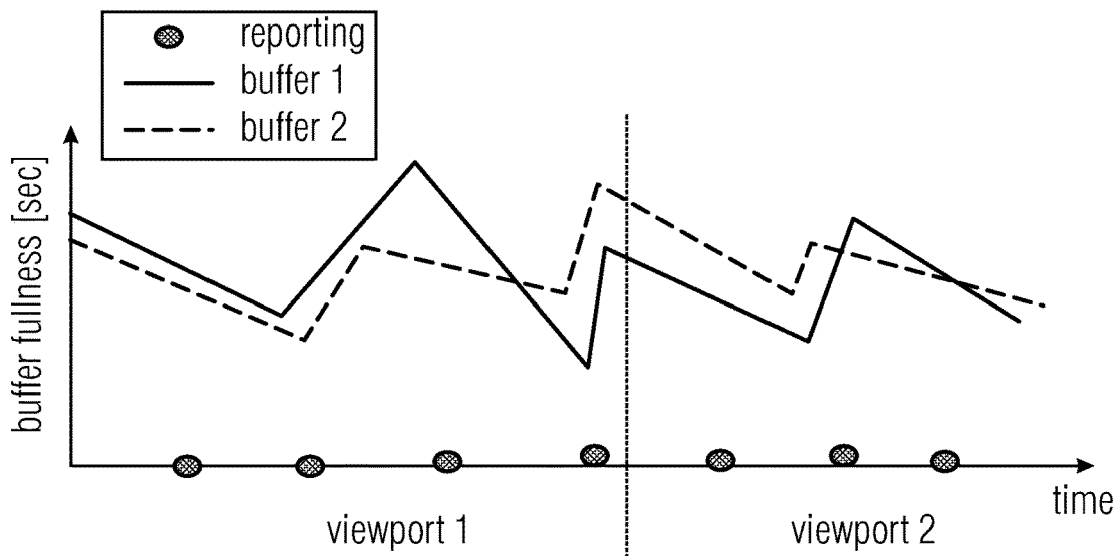
FIGS. 8c and d show a schematic diagram of a diagram showing along a temporal axis (horizontal) as to how a buffer fullness (vertical axis) of different buffers of the client might develop, wherein FIG. 8c assumes the buffers to be used to buffer representations coding specific tiles, while FIG. 8d assumes the buffers to be used to buffer omnidirectional representations having the scene encoded thereinto at uneven quality, namely increased toward some direction specific for the respective buffer.
Figure 8D:
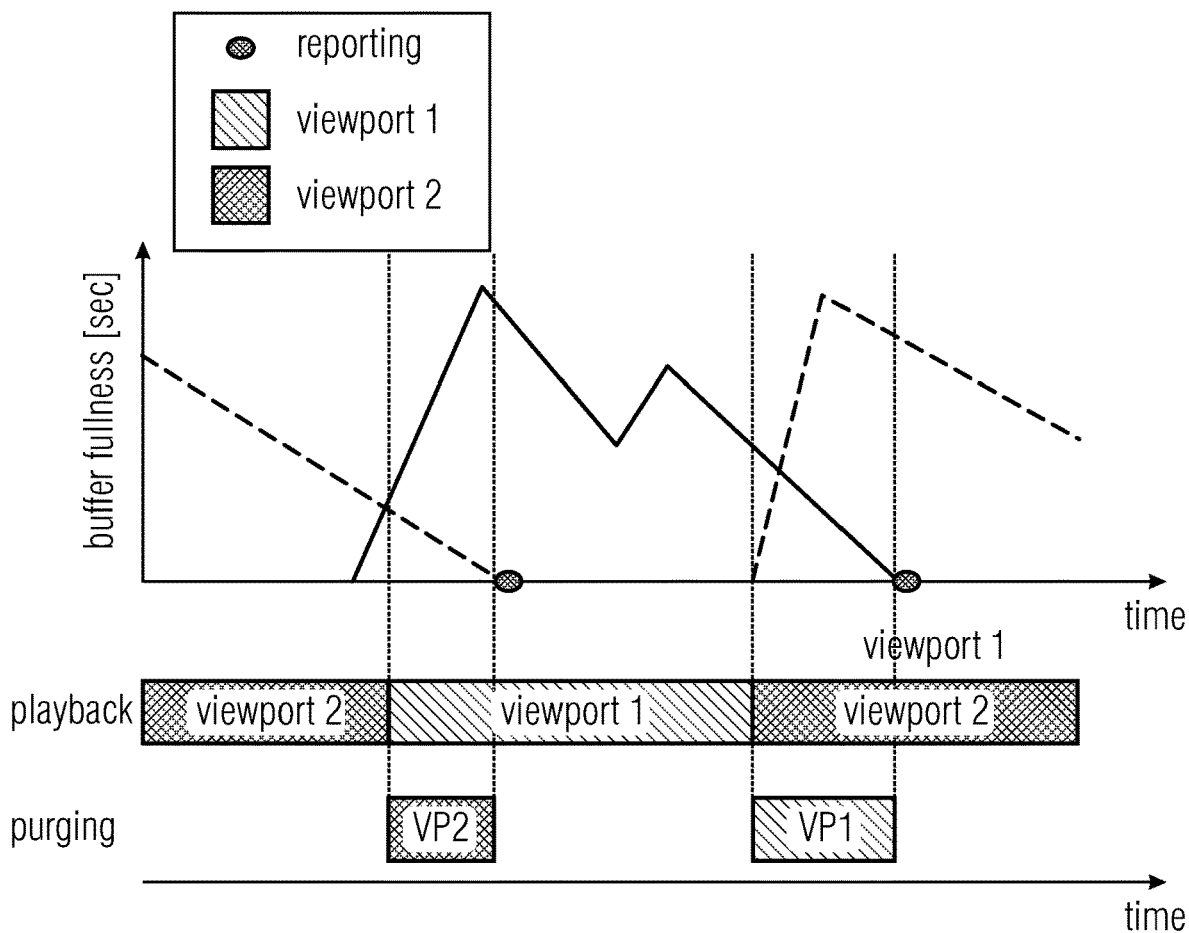
FIG. 8 e and f show a three-dimensional diagram of different pixel density measurements within the viewport 28, differing in terms of uniformity in spherical or view plane sense.

Imagine a tile-based streaming service using video with a cubic projection as depicted in FIG. 1. The reconstruction on client side is illustrated in FIG. 8b, in which small circles 198 indicate projections of a two-dimensional distribution of view directions, within the viewport 28 of the client, equi-angularly distributed horizontally and vertically, onto the picture areas covered by the individual tiles 50. Tiles marked hatched indicate high-resolution tiles, thus forming a high-resolution portion 64, while tile 50 shown non-hatched represent low-resolution tiles, thus forming the low-resolution portion 66. It can be seen that the user is presented partially low-resolution tiles as the viewport 28 changed since the last update to the segment selection and download which determines the resolution of each tile on the cube on which the projection planes or pixel arrays of the tiles 50 coded into the downloadable segments 58 lie.

While the above description rather generally, inter alias, indicated a feedback or log message which indicates the quality at which the video is presented to the user in the viewport, in the following, a more specific and advantageous metric applicable in this regard shall be outlined. The metric described now could be reported back from client side and be referred to as Effective Viewport Resolution. It is supposed to indicate to the service operator the effective resolution in the viewport of the client. In case the reported effective viewport resolutions indicates that a user was only presented a resolution towards the resolution of the low-resolution tiles, a service operator could change the tiling configuration, resolution ratios or segment length accordingly to achieve a higher effective viewport resolution.

One embodiment would be the average pixel count in the viewport 28, measured in the projection plan where the pixel array of the tiles 50 as coded into the segments 58 lies. The measurement could distinguish between, or be specific for, horizontal direction 204 and vertical direction 206 in relation to the covered Field of View (FoV) of the viewport 28. The following table shows a possible example for suitable syntax and semantics which could be contained in log messages so as to signal the outlined viewport quality measure.

| Key | Type | Description |
| --- | --- | --- |
| EffectiveRes | Object | EffectiveViewportResolution |
| EffectiveViewportResolutionH | Integer | Average horizontal effective resolution within viewport during reporting period |
| EffectiveViewportResolutionV | Integer | Average vertical effective resolution within viewport during reporting period |

The breakdown into horizontal and vertical direction could be left off with using a scalar value for the average pixel count instead. Along with an indication of the aperture or size of the viewport 28 which might also be reported to the recipient of the log messages, namely evaluator 82, the average count is indicative of the pixel density within the viewport.

It may be advantageous to reduce the FoV considered for the metric to be smaller than the FoV of the viewport actually presented to the user, thereby excluding areas towards the boundaries of the viewport that are only used for peripheral vision and hence do not have an impact on subjective quality perception. This alternative is illustrated by a dashed line 202 which encircles pixels lying in such a central section of the viewport 28. The reporting of the considered FoV 202 for the reported metric in relation to the viewport's 28 overall FoV, might also be signalled to the log message recipient 82. The following table shows a corresponding extension of the previous example.

| Key | Type | Description |
| --- | --- | --- |
| EffectiveRes | Object | EffectiveViewportResolution |
| ConsideredFoV_H | Integer | Horizontal portion around the center of the viewport used for gathering the pixel count |
| ConsideredFoV_V | Integer | Vertical portion around the center of the viewport used for gathering the pixel count |
| EffectiveFoVResolutionH | Integer | Average horizontal effective resolution within ConsideredFoV_H of viewport of during reporting period |
| EffectiveFoVResolutionV | Integer | Average vertical effective resolution within ConsideredFoV_V of viewport during reporting period |

According to a further embodiment, the average pixel density is not measured by averaging the quality in a spatially uniform manner in the projection plane as effectively the case in the example described so far with respect to the examples containing EffectiveFoVResolutionH/V, but in a manner weighting this averaging in a non-uniform manner over the pixels, i.e. the projection plane. The averaging may be performed in a spherically uniform manner. As an example, averaging may be performed uniform with respect to sample points distributed as the circles 198 are. In other words, the averaging may performed by weighting the local densities by a weight decreasing in a quadratic manner with increasing local projection plane distance and increasing according to sine of local tilt of the projection against the line connecting with the view point. The message may include an optional (flag controlled) step to adjust for the inherent oversampling of some of the available projections (such as Equirectangular Projection), e.g. by using an uniform sphere sampling grid. Some projections do not have a big oversampling issue and forcing computing removal of oversampling might lead to unnecessary complexity issues. This must not be limited to Equirectangular Projection. Reporting does not need to distinguish horizontal and vertical resolution but can combine them. The following gives one embodiment.

having multiple media buffers 300 as exemplarily depicted in FIG. 8a, i.e. DASH clients 10 forwarding the downloaded segments 58 to the subsequent decoding by the one or more decoder 42 (cp. FIG. 1). The distribution of the segments 58 onto the buffers could be made in different manners. For example the distribution could be made so that certain regions of a 360 video are downloaded separately from each other, or buffered after download into separate buffers. The following examples illustrate different distributions by indicating as to which tiles T indexed #1 to #24 as shown in FIG. 1 (antipodes have a sum of 25) are encoded into which individually downloadable representation R #1 to #P at which Quality Q of Qualities #1 to #M (with 1 being the best and M being the worst), and how these P representations R could be grouped into adaptation sets A indexed #1 to #S in the MPD (optional) and how the segments 58 of the P representations R could be distributed onto the buffer of buffers B indexed #1 to #N:

| R | T | Q | T | Q | T | Q | T | Q | T | Q | A | buffer |
|---|---|---|---|---|---|---|---|---|---|---|---|---|
| 1 | 1 | 1 | 5 | — | 9 | — | 13 | — | 17 | — | 21 | — | 1 | 1 |
|   | 2 | — | 6 | — | 10 | — | 14 | — | 18 | — | 22 | — |

| Key | Type | Description |
|---|---|---|
| EffectiveRes | Object | EffectiveViewportResolution |
| SphereOversamplingCompensationFlag | Integer | When equal to 0, pixel count for effectiveResolution is derived on the projected frame sampling grid. When equal to 1, pixel count for effectiveResolution is derived on the a uniform spherical sampling grid. |
| ConsideredFoV_H | Integer | Horizontal portion around the center of the viewport used for gathering the pixel count |
| ConsideredFoV_V | Integer | Vertical portion around the center of the viewport used for gathering the pixel count |
| EffectiveFoVResolutionH | Integer | Average horizontal effective resolution within ConsideredFoV_H of viewport of during reporting period |
| EffectiveFoVResolutionV | Integer | Average vertical effective resolution within ConsideredFoV_V of viewport during reporting period |

Figure 8E:
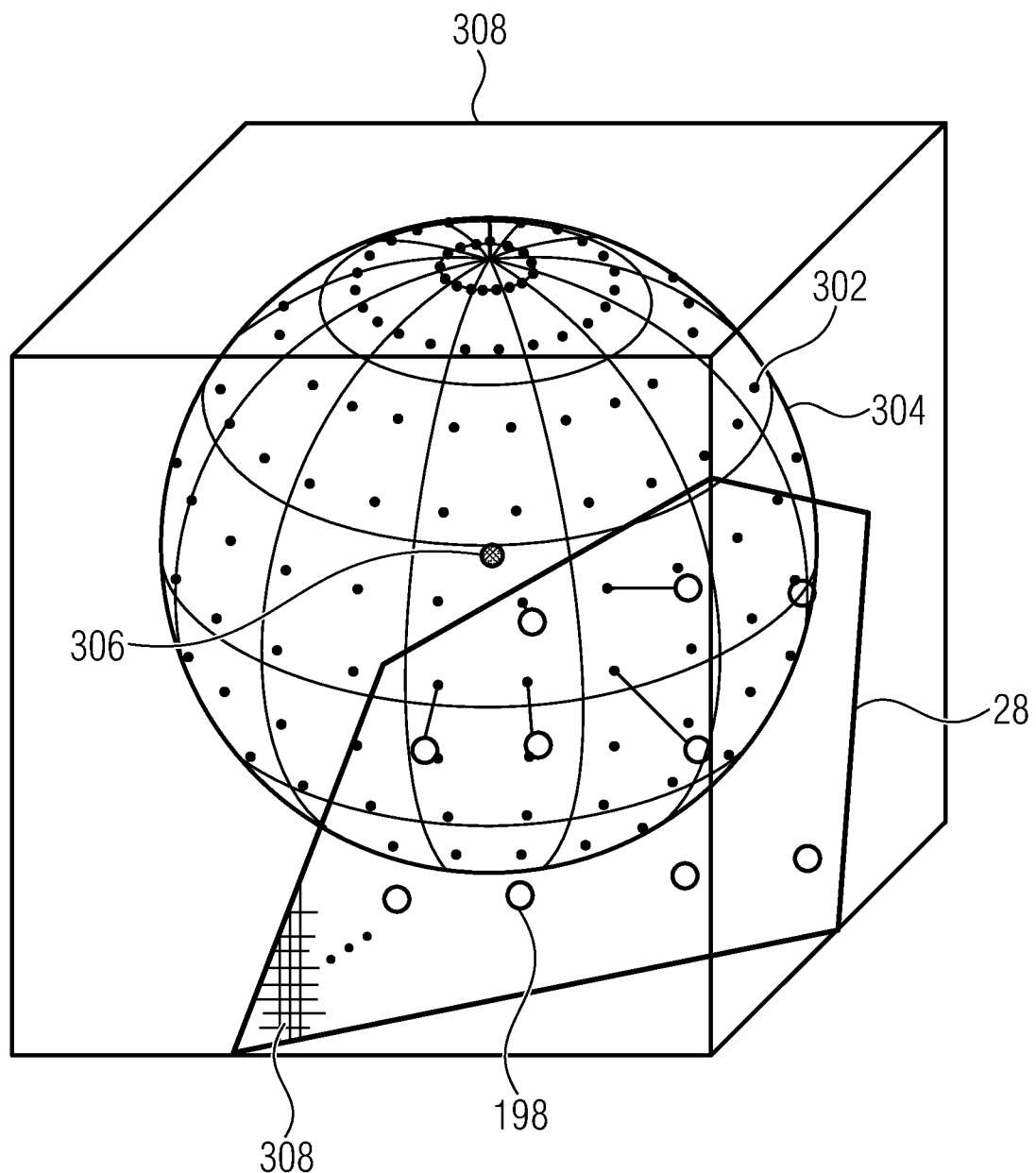
Figure 8F:
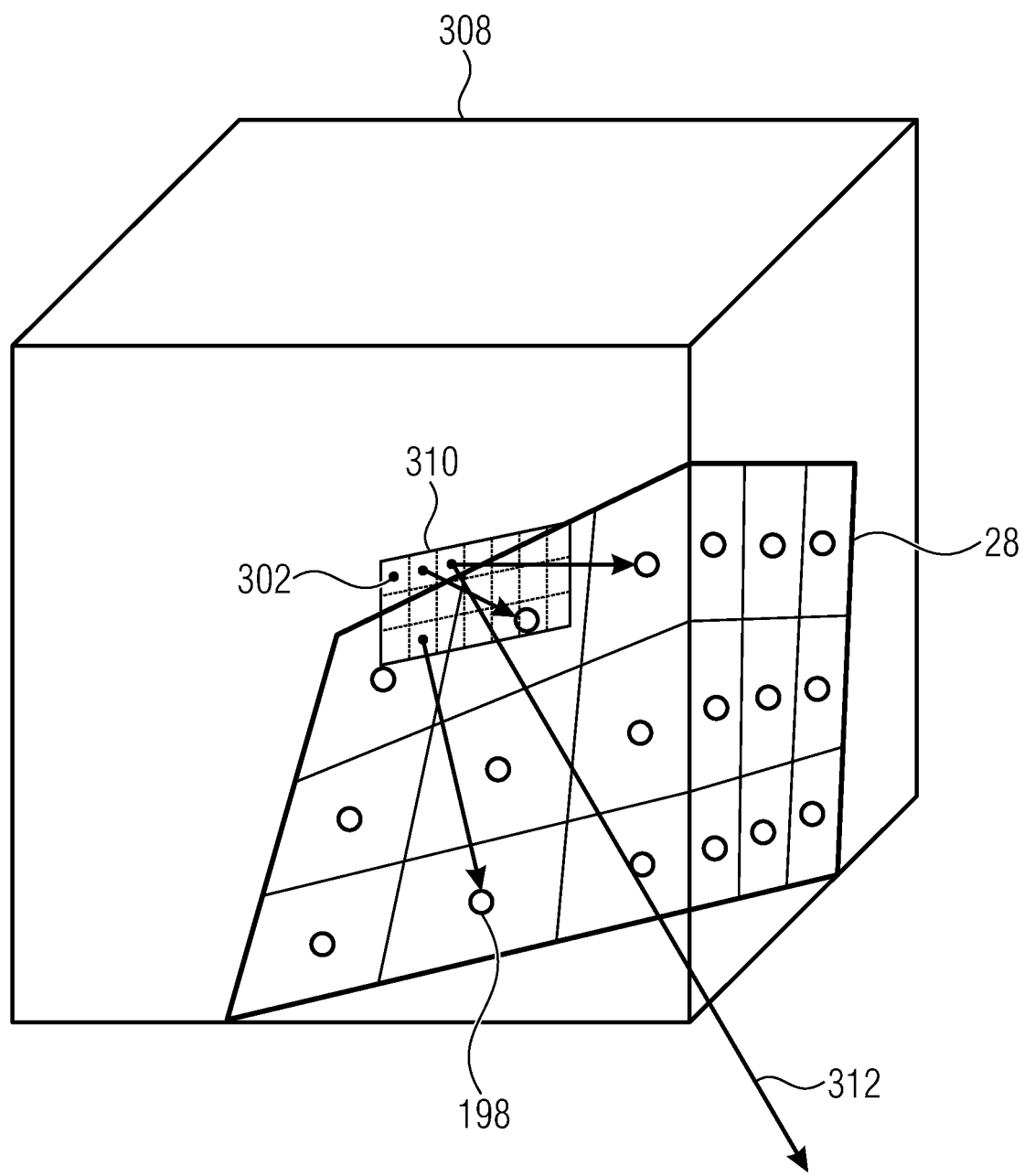

Applying an equiangular uniformity in averaging, is illustrated in FIG. 8e by showing how equiangularly horizontally and vertically distributed points 302 on a sphere 304 centered at the viewpoint 306 are, as far as being within the viewport 28, projected onto the projection plane 308 of the tile, here a cube, so as to perform the averaging of the pixel density of the pixels 308 arranged in an array, in columns and rows, in the projection area, so as to set the local weight for the pixel density according to the local density of the projections 198 of the points 302 onto the projection plane. A quite similar approach is depicted in FIG. 8f. Here, points 302 are equi-distantly distributed, i.e. uniformly horizontally and vertically in columns and rows, in a viewport plane perpendicular to the view direction 312, and the projection onto projection plane 308 defines the points 198, the local density of which controls the weight at which the local density pixel density 308 (varying because of high and low resolution tiles within viewport 28, contribute to the average. The alternative of FIG. 8f may be used instead of the one depicted in FIG. 8e in the above examples such as the most recent table.

In the following, an embodiment for a further sort of log message is described which is related to DASH clients 10

-continued

| R | T | Q | T | Q | T | Q | T | Q | T | Q | A | buffer |
|---|---|---|---|---|---|---|---|---|---|---|---|---|
|   | 3 | — | 7 | — | 11 | — | 15 | — | 19 | — | 23 | — |
|   | 4 | — | 8 | — | 12 | — | 16 | — | 20 | — | 24 | — |
| 2 | 1 | 2 | 5 | — | 9 | — | 13 | — | 17 | — | 21 | — | 1 | 1 |
|   | 2 | — | 6 | — | 10 | — | 14 | — | 18 | — | 22 | — |
|   | 3 | — | 7 | — | 11 | — | 15 | — | 19 | — | 23 | — |
|   | 4 | — | 8 | — | 12 | — | 16 | — | 20 | — | 24 | — |
| 3 | 1 | — | 5 | — | 9 | — | 13 | — | 17 | — | 21 | — | 2 | 2 |
|   | 2 | 1 | 6 | — | 10 | — | 14 | — | 18 | — | 22 | — |
|   | 3 | — | 7 | — | 11 | — | 15 | — | 19 | — | 23 | — |
|   | 4 | — | 8 | — | 12 | — | 16 | — | 20 | — | 24 | — |
| 4 | 1 | — | 5 | — | 9 | — | 13 | — | 17 | — | 21 | — | 2 | 2 |
|   | 2 | 2 | 6 | — | 10 | — | 14 | — | 18 | — | 22 | — |
|   | 3 | — | 7 | — | 11 | — | 15 | — | 19 | — | 23 | — |
|   | 4 | — | 8 | — | 12 | — | 16 | — | 20 | — | 24 | — |
| 5 | 1 | — | 5 | — | 9 | — | 13 | — | 17 | — | 21 | — | 3 | 3 |
|   | 2 | — | 6 | — | 10 | — | 14 | — | 18 | — | 22 | — |
|   | 3 | 1 | 7 | — | 11 | — | 15 | — | 19 | — | 23 | — |
|   | 4 | — | 8 | — | 12 | — | 16 | — | 20 | — | 24 | — |

. . .

Here, representations would be offered at the server and advertised in the MPD for download, each of which relates to one tile 50, i.e. one section of the scene. Representations relating to one tile 50, but encoding this tile 50 at different qualities would be summarized in adaptation set which grouping is optional, but exactly this grouping is used for association to buffers. Thus, according to this example, there would be one buffer per tile 50, or in other words, per viewport (view section) encoding.

Another representation set and distribution would be

| R | T | Q | T | Q | T | Q | T | Q | T | Q | T | Q | A | buffer |
|---|---|---|---|---|---|---|---|---|---|---|---|---|---|---|
| 1 | 1 | 1 | 5 | 1 | 9 | 2 | 13 | 2 | 17 | 2 | 21 | 2 | 1 | 1 |
|   | 2 | 1 | 6 | 2 | 10 | 1 | 14 | 1 | 18 | 1 | 22 | 2 |   |   |
|   | 3 | 1 | 7 | 2 | 11 | 2 | 15 | 2 | 19 | 1 | 23 | 2 |   |   |
|   | 4 | 1 | 8 | 1 | 12 | 1 | 16 | 1 | 20 | 2 | 24 | 2 |   |   |
| 2 | 1 | 2 | 5 | 2 | 9 | 3 | 13 | 3 | 17 | 3 | 21 | 3 | 1 | 1 |
|   | 2 | 2 | 6 | 3 | 10 | 2 | 14 | 2 | 18 | 2 | 22 | 3 |   |   |
|   | 3 | 2 | 7 | 3 | 11 | 3 | 15 | 3 | 19 | 2 | 23 | 3 |   |   |
|   | 4 | 2 | 8 | 2 | 12 | 2 | 16 | 2 | 20 | 3 | 24 | 3 |   |   |
| 3 | 1 | 2 | 5 | 2 | 9 | 1 | 13 | 2 | 17 | 2 | 21 | 2 | 2 | 2 |
|   | 2 | 2 | 6 | 2 | 10 | 1 | 14 | 2 | 18 | 2 | 22 | 2 |   |   |
|   | 3 | 1 | 7 | 1 | 11 | 1 | 15 | 2 | 19 | 1 | 23 | 1 |   |   |
|   | 4 | 1 | 8 | 1 | 12 | 1 | 16 | 2 | 20 | 1 | 24 | 1 |   |   |
| 4 | 1 | 3 | 5 | 3 | 9 | 2 | 13 | 3 | 17 | 3 | 21 | 3 | 2 | 2 |
|   | 2 | 3 | 6 | 3 | 10 | 2 | 14 | 3 | 18 | 3 | 22 | 3 |   |   |
|   | 3 | 2 | 7 | 2 | 11 | 2 | 15 | 3 | 19 | 2 | 23 | 2 |   |   |
|   | 4 | 2 | 8 | 2 | 12 | 2 | 16 | 3 | 20 | 2 | 24 | 2 |   |   |
| 5 | 1 | 2 | 5 | 2 | 9 | 1 | 13 | 1 | 17 | 1 | 21 | 1 | 3 | 3 |
|   | 2 | 2 | 6 | 1 | 10 | 2 | 14 | 2 | 18 | 2 | 22 | 1 |   |   |
|   | 3 | 2 | 7 | 1 | 11 | 1 | 15 | 1 | 19 | 2 | 23 | 1 |   |   |
|   | 4 | 2 | 8 | 2 | 12 | 2 | 16 | 2 | 20 | 1 | 24 | 1 |   |   |
| ... |

According to this example, each representation would cover the whole region, but the high quality region would focus onto one hemisphere, while a lower quality is used for the other. Representations merely differing in the exact qualities spent in this manner, i.e. equalling in higher quality hemisphere's location, would be collected in one adaptation set and are, according to this characteristic, distributed onto the buffers, here exemplarily six.

Thus, the following description assumes that such distribution onto buffers according to different viewport encodings, video sub-region such as tiles, associated with AdaptationSets or the like is applied. FIG. 8 *c* illustrates the buffer fullness levels over time for two separate buffers., e.g. tile 1 and tile 2, in a tile based streaming scenario as it has been illustrated in the last but least table. Enabling a client to report fullness level of all its buffers allows that a service operator may correlate the data with other streaming parameters to understand Quality of Experience (QoE) impact of his service setup.

The advantage therefrom is that buffer fullness of multiple media buffers on client-side can be reported with a metric and be identified and associated to a type of buffer. The association types are for example:
Tile
Viewport
Region
AdaptationSet
Representation
Low quality version of the whole content One embodiment of this invention is given in Table 1 that defines a metric for reporting buffer level status events for each buffer with identification and association.

TABLE 1

List of buffer levels

| Key | Type | Description |
|---|---|---|
| ComponentBufferLevels | List | List of component buffers |
| Entry | Object | An entry for a single component BufferLevel |
| bufferId | Integer | Identifier of the component BufferLevel |
| componentType | Integer | Component Identifier of the component BufferLevel |
| BufferLevel | List | List of component buffer occupancy level measurements during playout at normal speed. |
| Entry | Object | One component buffer level measurement. |
| t | Real-Time | Time of the measurement of the buffer level. |
| level | Integer | Level of the buffer in milliseconds. Indicates the playout duration for which media data of all active media components is available starting from the current playout time. |

A further embodiments using viewport depending encodings is as follows:

In a viewport-dependent streaming scenario, a DASH client downloads and prebuffers several media segments related to a certain viewing orientation (viewport). If the amount of prebuffered content is too high, and the client changes its viewing orientation, the portion of the prebuffered content to be played out after the viewport change is not presented and the respective media buffer is purged. This scenario is depicted in FIG. 8 *d*

Another embodiment would relate to a traditional video streaming scenario with multiple representation (quality/bitrates) of the same content and maybe spatially uniform quality at which the video content is encoded.

The distribution could then look like:

| R | T | Q | T | Q | T | Q | T | Q | T | Q | T | Q | A | buffer |
|---|---|---|---|---|---|---|---|---|---|---|---|---|---|---|
| 1 | 1 | 1 | 5 | 1 | 9 | 1 | 13 | 1 | 17 | 1 | 21 | 1 | 1 | 1 |
|   | 2 | 1 | 6 | 1 | 10 | 1 | 14 | 1 | 18 | 1 | 22 | 1 |   |   |
|   | 3 | 1 | 7 | 1 | 11 | 1 | 15 | 1 | 19 | 1 | 23 | 1 |   |   |
|   | 4 | 1 | 8 | 1 | 12 | 1 | 16 | 1 | 20 | 1 | 24 | 1 |   |   |
| 2 | 1 | 2 | 5 | 2 | 9 | 2 | 13 | 2 | 17 | 2 | 21 | 2 | 1 | 2 |
|   | 2 | 2 | 6 | 2 | 10 | 2 | 14 | 2 | 18 | 2 | 22 | 2 |   |   |
|   | 3 | 2 | 7 | 2 | 11 | 2 | 15 | 2 | 19 | 2 | 23 | 2 |   |   |
|   | 4 | 2 | 8 | 2 | 12 | 2 | 16 | 2 | 20 | 2 | 24 | 2 |   |   |
| 3 | 1 | 3 | 5 | 3 | 9 | 3 | 13 | 3 | 17 | 3 | 21 | 3 | 1 | 3 |
|   | 2 | 3 | 6 | 3 | 10 | 3 | 14 | 3 | 18 | 3 | 22 | 3 |   |   |

-continued

| R | T | Q | T | Q | T | Q | T | Q | T | Q | T | Q | A | buffer |
|---|---|---|---|---|---|---|---|---|---|---|---|---|---|---|
| 3 | 3 | 7 | 3 | 11 | 3 | 15 | 3 | 19 | 3 | 23 | 3 | | | |
| 4 | 3 | 8 | 3 | 12 | 3 | 16 | 3 | 20 | 3 | 24 | 3 | | | |
| ... | | | | | | | | | | | | | | |

That is, here, each representation would cover the whole scene for instance which may not be a panoramic 360 scene, but at different quality, namely a spatially uniform quality, and these representations would be distributed onto the buffers individually. All the examples set out in the last three tables should be treated as not limiting the manner at which segments 58 of representations offered at the server are distributed onto the buffers. Different ways exist and the rule may be based on membership of segments 58 to representations, membership of segments 58 to adaptation sets, the direction of locally increased quality of a spatially unequally coding of the scene into the representation which the respective segment belongs to, the quality at which a scene is encoded into the respective segment belongs to and so forth.

A client could maintain a buffer per representation and, upon experiencing a rise in available throughput, decide to purge the remaining low-quality/bitrate media buffer before playback and download high quality media segments of time durations within the already existing low-quality/bitrate buffer. Similar embodiments can be constructed for streaming based on tiles and viewport dependent encodings.

A service operator may be interested in understanding what amount and which data was downloaded without being presented as this introduces cost without gain on server-side and decreases quality on client side. Therefore, the invention is to provide a reporting metric that correlates the two events 'media download' and 'media presentation' to be easily interpreted. This invention avoids that verbosely reported information about each and every media segment download and playback status is to be analysed and allows efficient reporting of purging events only. The invention also includes identification of the buffer and association to the type as above. An embodiment of the invention is given in Table 2.

TABLE 2

List of purging Events

| Key | Type | Description |
|---|---|---|
| ComponentBufferPurging | List | List of Component buffer purging measurements |
| Entry | Object | One Component buffer purging measurement |
| buffer Id | Integer | Identifier of the component BufferLevel |
| componentType | Integer | Component Identifier of the component BufferLevel |
| T | Real-Time | Time of the measurement of the Component buffer purging. |
| D | Integer | Measurement of the Component buffer purging duration in milliseconds. |

Figure 9:
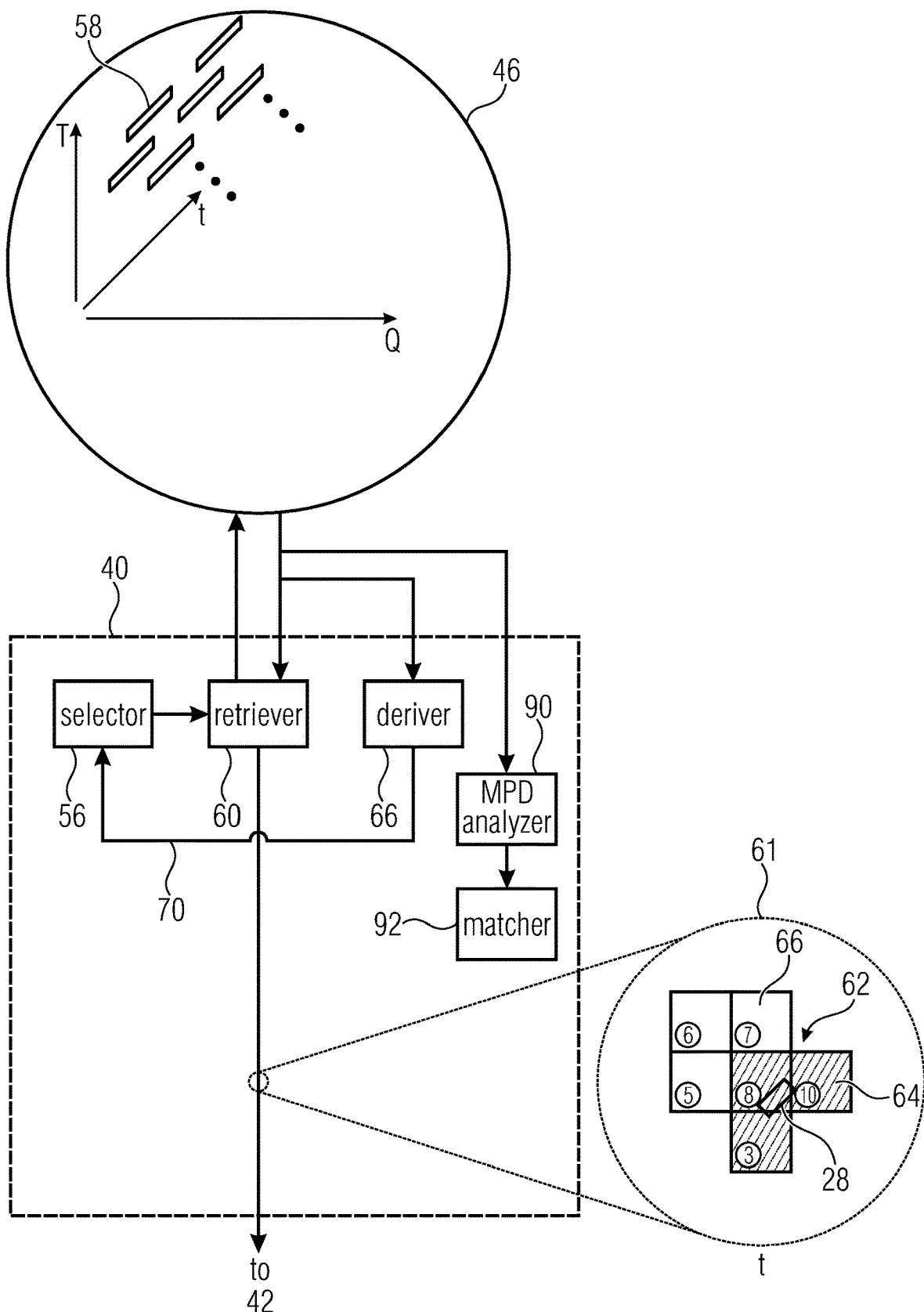
FIG. 9 shows a block diagram of client device and a schematic illustration of the media segment selection process when the device inspects information stemming from the server in order to assess whether a certain version at which a tile-based streaming is offered by the server, is acceptable for the client device or not.

FIG. 9 shows a further embodiment of how to implement advantageously device 40, Device 40 of FIG. 9 may correspond to any of the examples set out above with respect to FIGS. 1 to 8. That is, it may possibly comprise a lock messenger as discussed above with respect to FIG. 8a but does not have to and may use information 68 as discussed above with respect to FIGS. 2 and 3 or information 74 as discussed above with respect to FIGS. 5 to 7c but does not have. Differing from the description of FIGS. 2 to 8, however, with respect to FIG. 9 it is assumed that the tile-based streaming approach is really applied. That is, the scene content 30 is offered at server 20 in the tile-based manner discussed as an option above with respect to FIGS. 2 to 8.

Although the internal structure of device 40 may differ from the one depicted in FIG. 9, device 40 is exemplarily shown to comprise selector 56 and retriever 60 already discussed above with respect to FIGS. 2 to 8 and, optionally, deriver 66. Additionally, however, device 40 comprises a media presentation description analyzer 90 and a matcher 92. The MPD analyzer 90 is for deriving from the media presentation description obtained from server 20: at least one version at which the temporally-varying spatial scene 30 is offered for the tile-based streaming, and to, for each of the at least one version, an indication of benefitting requirements for benefitting from the tile-based streaming the respective version of the temporally-varying spatial scene. The meaning of "version" will become clear from the following description. In particular, matcher 92 matches the benefitting requirements thus obtained with a device capability of device 40 or another device interacting with device 40 such as decoding capabilities of the one or more decoders 42, the number of decoders 42 or the like. The background or thoughts underlying the concept of FIG. 9 is the following. Imagine, the tile-based approach uses, assuming a certain size of view section 28, a certain number of tiles being comprised by section 62. Further, it may be assumed that the media segments belonging to a certain tile form one media stream or video stream which is to be decoded by a separate decoding instantiation, separate from decoding media segments belonging to another tile. Accordingly, the moving aggregation of a certain number of tiles within section 62 for which the corresponding media segments are selected by selector 56, uses a certain decoding capability such as the existence of respective decoding resources in the form of, for example, the corresponding number of decoding instantiations, i.e. the corresponding number of decoders 42. If such a number of decoders is not present, the service provided by server 20 may not be useful for the client. Accordingly, the MPD provided by server 20 may indicate the "benefitting requirement", namely, the number of decoders needed to use the service provided. Server 20 may, however, provide the MPD for different versions. That is, different MPDs for different versions may be available by server 20 or the MPDs provided by server 20 may, internally, be structured so as to differentiate between different versions at which the service may be used. For instance, the versions could differ in field of view, i.e. the size of view section 28. Difference sizes of field of view manifest themselves in a different number of tiles within section 62 and may thus differ in the benefitting requirements in that, for instance, a different number of decoders may be needed for these versions. Other examples are imaginable as well. For example, while versions differing in field of view may involve the same plurality of media segments 46, in accordance with another example, different versions at which scene 30 is offered for tile-streaming at server 20 may differ in even the pluralities 46 of media segments involved in accordance with the corresponding version. For example, the tile-partitioning in accordance with one version is coarser that compared to the tile-hyphen partitioning of the scene in accordance with another version, thereby using a lower number of decoders, for instance.

Matcher 92 matches the benefitting requirements and thus, selects a corresponding version or rejects all versions, completely.

The benefitting requirements may, however, additionally concern profiles/levels which the one or more decoders 42 have to be able to cope with. For example, a DASH MPD includes multiple positions that allow for indicating profiles.

Typical profiles describe attributes, elements that can be present at the MPD, as well as video or audio profiles of the streams that are offered for each representation.

Further examples for the benefiting requirements concern, for example, the client's side capability to move the viewport 28 across the scene. The benefiting requirements may indicate a used viewport speed which should be available for the user to move the viewport so to be able to really enjoy the offered scene content. The matcher would check, for instance, whether this requirement is met be the, for example, plugged-in user input device such as HMD 26. Alternatively, a set of "sufficient types of input devices" could be indicated by way of the benefiting requirements assuming that different types of input devices for moving a viewport are associated with typical movement speeds in orientation sense.

In a tiled streaming service of spherical video, there are too many configuration parameters that can be dynamically set, e.g. number of qualities, number of tiles. In a case where tiles are independent bitstreams that need to be decoded by separate decoders, if the number of tiles is too high, it might be impossible for hardware devices with few decoders to decode all bitstreams simultaneously. A possibility is to leave this as a degree of freedom and that a DASH device parses all possible representations and counts how many decoders are used to decode all the representations or a given number that cover the FoV of the devices and thus derives whether it is possible or not for that DASH client to consume the content. However, a more clever solution for interoperability and capability negotiations is to use signaling in the MPD that is mapped to a kind of profile that is used as a promise to the client that if a profile is supported, the offered VR content can be consumed. Such a signaling should be done in the form of a URN, such as urn::dash-mpeg::vr:: 2016, which can be packed either at the MPD level or at adaptation sets. This profiling would mean that N decoders at X profile are enough for consuming the content. Depending on the profiles the DASH client could ignore or accept an MPD or a part of an MPD (adaptation set). In addition, there are several mechanisms that do not include all information such as Xlink or MPD chaining, where few signaling for selection are made available. In such a circumstance the DASH client would not be able to derive whether it can consume the content or not. Exposing the decoding capabilities in terms of number of decoders and profile/level of each decoder by means of such an urn (or something similar) is used, such that the DASH client can now, whether performing Xlink or MPD Chaining or a similar mechanism, makes sense. The signaling could also mean different operation points such as N decoders with X profile/level or Z decoders with Y profile/level.

Figure 10:
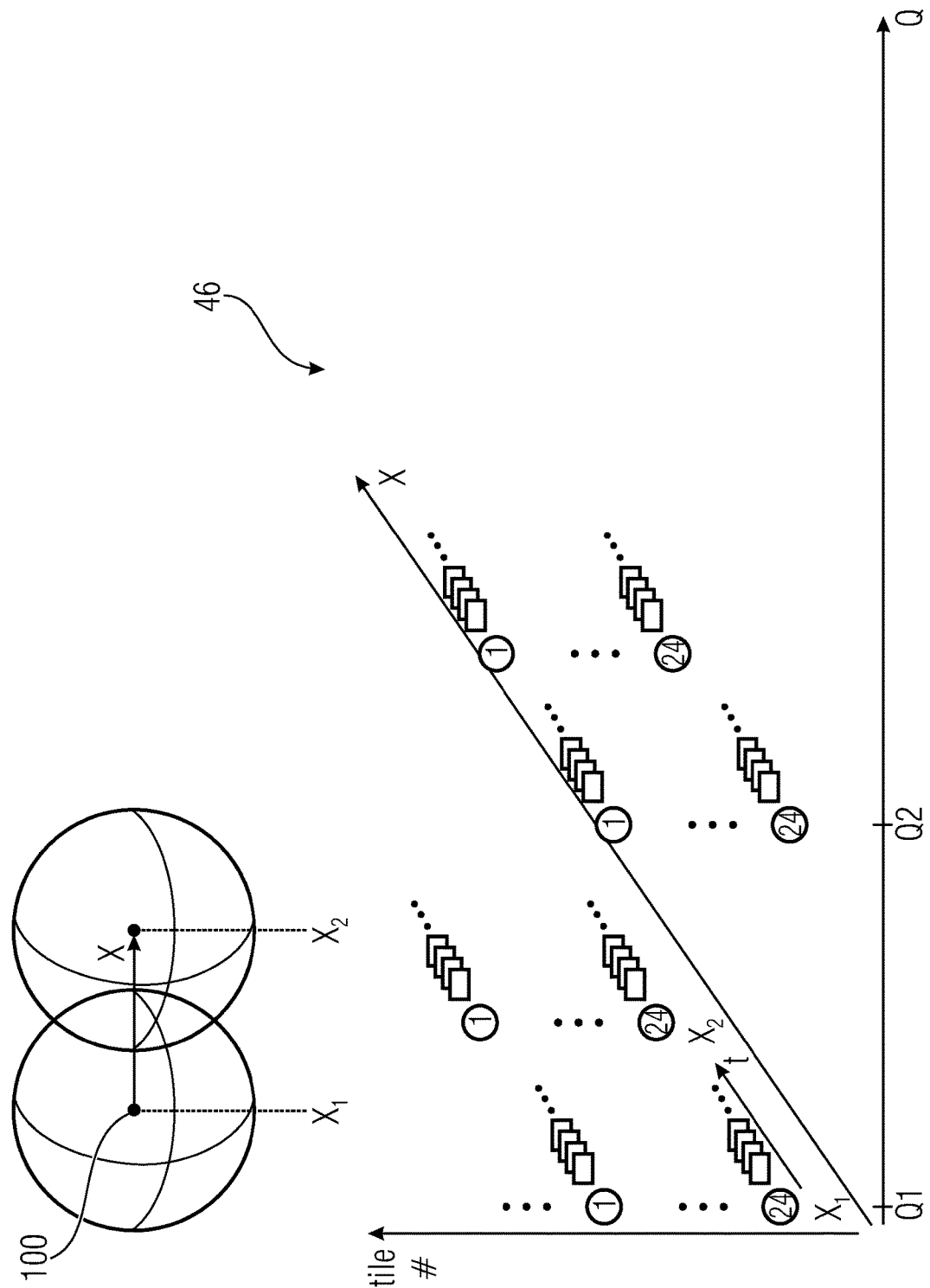
FIG. 10 shows a schematic diagram illustrating the plurality of media segments offered by a server in accordance with an embodiment allowing for a dependency of the media scene not only in time, but also in another non-temporal parameter, namely here, exemplarily, scene center position.

FIG. 10 further illustrates that any of the above described embodiments and descriptions presented with respect to FIGS. 1 to 9 for client, device 40, server and so forth, may be expanded to the extent that the offered service is expanded to the extent that the temporally-varying spatial scene does not only vary in time, but also depending on another parameter. FIG. 10, for instance, illustrates a variant of FIG. 1 where the available plurality of media segments resulting on the server describe the scene content 30 for different positions of the view center 100. In the schematic shown in FIG. 10, the scene center is depicted to merely vary along one direction X but it is obvious that the view center may be varied along more than one spatial direction such as two-dimensionally or three-dimensionally. This corresponds to a change of the user in user position in a certain virtual environment, for example. Depending on the user position in the virtual environment, its available view changes and accordingly, scene 30 changes. Accordingly, in addition to the media segments describing scene 30 subdivided into tiles and temporal segments as well as different qualities, further media segments describe a different content of scene 30 for a different position of the scene center 100. Device 40, or selector 56, respectively, would compute, depending on view section position and the at least one parameter such as parameter X, the addresses of media segments out of plurality 46 which are to be retrieved within the selection process and these media segments would then be retrieved from the server using the computed addresses. To this end, the media presentation description may describe a function depending on tile index, quality index, scene center position as well as time t and results in the corresponding address of the respective media segment. Thus, in accordance with the embodiment of FIG. 10, the media presentation description would comprise such a computation rule which depends, in addition to the parameters set forth above with respect to FIGS. 1 to 9, on one or more additional parameters. The parameter X may be quantized onto any of levels for which respective scene representations are coded by way of corresponding media segments within plurality 46 in server 20.

As an alternative, X may be a parameter defining a view depth, i.e. a distance from the scene center 100 in radial sense. While offering scene in different versions differing in view center portion X allows for the user "walking" through the scene, offering scene in different versions differing in view depth would allow for the user "radially zoom" back and forth through the scene.

For multiple, non-concentrical viewports the MPD thus may use a further signaling of the position of the current viewport. Signaling can be done on segment, representation or period level, or the like.

Non-concentric spheres: in order for a user to move, the spatial relationship of the different spheres should be signaled in the MPD. This could be done by means of coordinates (x,y,z) in arbitrary units in relation to the sphere diameter. In addition, the diameter of a sphere should be indicated for each sphere. A sphere could be "good-enough" to be used for a user that is in its center plus an additional space for which the content would be ok. If a user would move beyond that signaled diameter, another sphere should be used for showing the content.

Exemplary signaling of viewport could be done relative to a predefined center point in space. Each viewport is signaled relative to that center point. In MPEG-DASH, this can be signaled e.g. in the AdaptationSet element.

| Element or Attribute Name | Use | Description |
|---|---|---|
| AdaptationSet | | Adaptation Set description |
| ViewPortPosition | 0 . . . 1 | Describes the relative distance to Viewportcenter |

Legend:

For attributes:

M = Mandatory,

O = Optional,

OD = Optional with Default Value,

CM = Conditionally Mandatory,

F = Fixed.

For elements: <minOccurs> . . . <maxOccurs> (N = unbounded)

Note that the conditions only holds without using xlink:href. If linking is used, then all attributes are "optional" and <minOccurs = 0>

Elements are bold; attributes are non-bold and preceded with an @, List of elements and attributes is in *italics bold*  referring to those taken from the Base type that has been extended by this type.

| Element or Attribute Name | Use | Description |
| --- | --- | --- |
| ViewPortPosition | | Viewport position description |
| @viewport_x | M | Distance of sphere center point expressing the horizontal distance to the global center with coordiantes x = 0, y = 0, z = 0. |
| @viewport_y | M | Distance of sphere center point expressing the vertical distance to the global center with coordiantes x = 0, y = 0, z = 0. |
| @viewport_z | M | Distance of sphere center point expressing the depth (z) distance to the global center with coordiantes x = 0, y = 0, z = 0. |
| @viewport_diameter | M | Diameter of the sphere |

Legend:
 For attributes:
 M = Mandatory,
 O = Optional,
 OD = Optional with Default Value,
 CM = Conditionally Mandatory,
 F = Fixed.
 For elements: <minOccurs> . . . <maxOccurs> (N = unbounded)
 Note that the conditions only holds without using xlink:href. If linking is used, then all attributes are "optional" and <minOccurs = 0>
Elements are bold; attributes are non-bold and preceded with an @, List of elements and attributes is in *italics* bold referring to those taken from the Base type that has been extended by this type.

Figure 11:
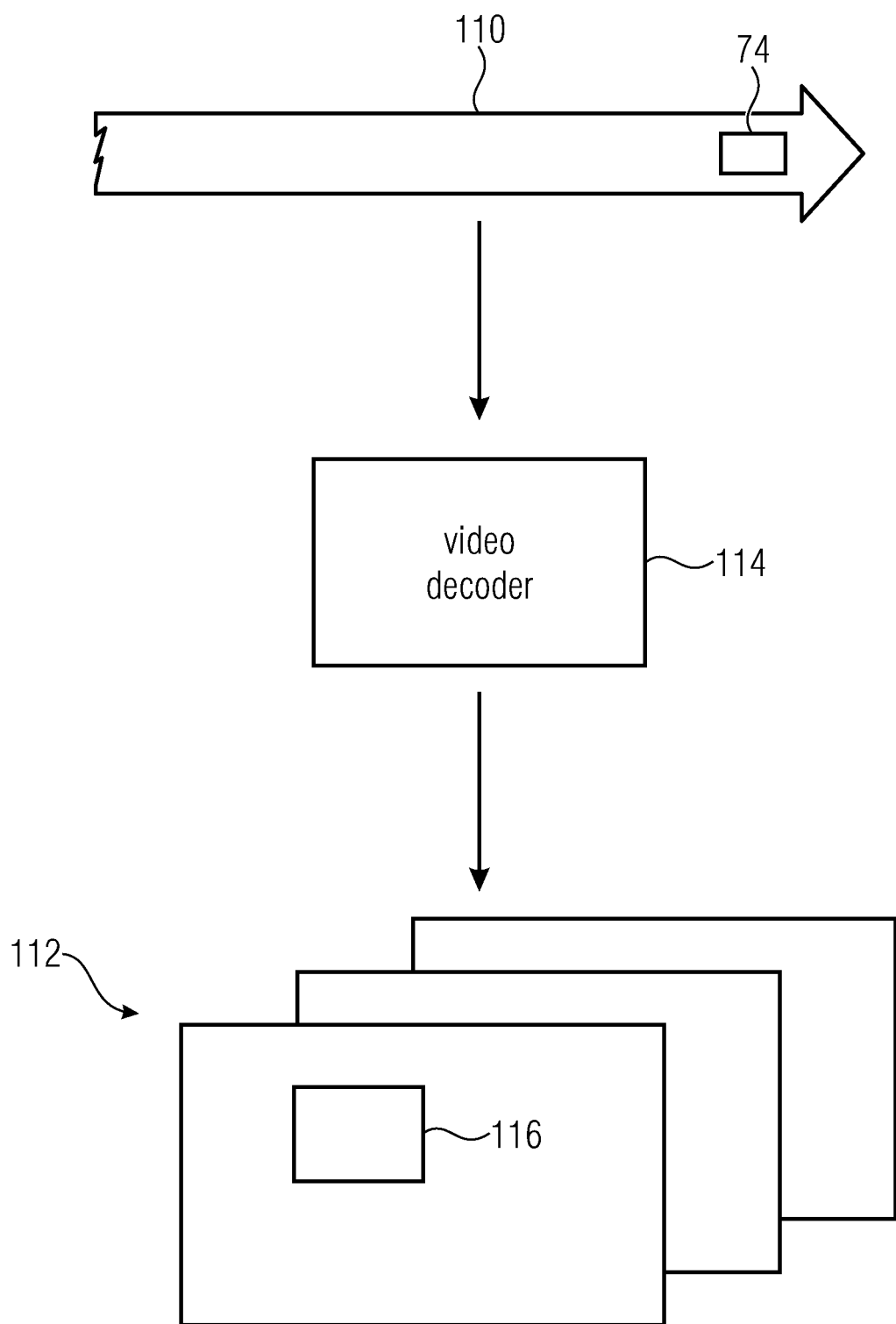
FIG. 11 shows a schematic diagram illustrating a video bit stream comprising information steering or controlling a size of a focus area within the video encoded into the bit stream along with an example for a video decoder able to take advantage of this information.

Lastly, FIG. 11 illustrates that information such as or similar to that described above with respect to reference number 74 may reside in a video bit stream 110 into which a video 112 is encoded. A decoder 114 decoding such a video 110 may use information 74 to determine a size of a focus area 116 within video 112 onto which a decoding power for decoding video 110 should be focused. Information 74 could, for instance, be conveyed within an SEI message of video bit stream 110. For example, the focus area could be decoded exclusively, or decoder 114 could be configured to start decoding each picture of the video at the focus area, instead of, for example, the upper left picture corner, and/or decoder 114 could cease decoding each picture of the video upon having decoded the focus area 116. Additionally or alternatively, the information 74 may be present in the data stream simply for being forwarded to a subsequent renderer or a viewport control or the streaming apparatus of client or segments selector for deciding which segments to download or stream in order to cover which spatial section at all or at increased or predetermined quality. The information 74 indicate, for example, as outlined above, a recommended area as a recommendation to place the view section 62 or section 66 to coincide with, or cover, or track, this area. It may be used by the client's segment selector. Just as it was true with respect to the description with respect to FIGS. 4 to 7c, information 74 may set the dimension of area 116 absolutely, such as in number of tiles, or may a set a speed of area 116 wherein the area is moved, for example, according to user input, or the like, in order to follow a interesting content of the video spatiotemporally, thereby scaling area 116 so as to increase with increasing indication of the speed.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The signals occurring above such as the streamed signal, the MPD or any other of the mentioned signals can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[A1] ISO/IEC 23009-1:2014, Information technology—Dynamic adaptive streaming over HTTP (DASH)—Part 1: Media presentation description and segment formats

What is claimed is:

1. A video encoding method comprising
    encoding an omnidirectional video into a video bitstream using a cubic projection for mapping pictures of the omnidirectional video onto pictures coded into the video bitstream, and
    providing the video bitstream with SEI messages containing
        a signalization associated with multiple recommended viewport sections of the omnidirectional video determined based on a measurement of a statistical value, wherein the signalization indicates that the multiple recommended viewport sections are organized as a list ranked according to a frequency ranking gained by statistics of user popularity, and
        an indication of a temporal persistence of the signalization,
        so that the recommended viewport sections are variable by the signalization contained by the SEI messages spatiotemporally across the omnidirectional video.

2. The video encoding method according to claim 1, comprising encoding the video into the video bitstream in units of tiles into which the video is spatially subdivided.

* * * * *